United States Patent
Yoo et al.

(10) Patent No.: US 8,429,532 B2
(45) Date of Patent: *Apr. 23, 2013

(54) METHODS AND APPARATUSES FOR MANAGING REPRODUCTION OF TEXT SUBTITLE DATA

(75) Inventors: Jea Yong Yoo, Seoul (KR); Byung Jin Kim, Seongnam-si (KR); Kang Soo Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 944 days.

This patent is subject to a terminal disclaimer.

(21) Appl. No.: 11/706,382

(22) Filed: Feb. 15, 2007

(65) Prior Publication Data

US 2007/0160342 A1    Jul. 12, 2007

Related U.S. Application Data

(63) Continuation of application No. 11/118,332, filed on May 2, 2005, now Pat. No. 7,571,386.

(60) Provisional application No. 60/566,923, filed on May 3, 2004.

(30) Foreign Application Priority Data

May 18, 2004    (KR) .................. 10-2004-0035188

(51) Int. Cl.
*G06F 3/00* (2006.01)
*G06F 17/00* (2006.01)

(52) U.S. Cl.
USPC ............ 715/723; 715/716; 715/719; 715/202

(58) Field of Classification Search .......... 715/200–203, 715/716, 719, 722–723
See application file for complete search history.

(56) References Cited

U.S. PATENT DOCUMENTS 5,253,530 A    10/1993 Letcher, III
5,467,142 A    11/1995 Ichinokawa
(Continued)

FOREIGN PATENT DOCUMENTS

CN    1348588    5/2002
CN    1359521    7/2002
(Continued)

OTHER PUBLICATIONS

Office Action for corresponding Chinese Application No. 200580014078.8 dated Oct. 31, 2008.
(Continued)

*Primary Examiner* — Weilun Lo
*Assistant Examiner* — Truc Chuong
(74) *Attorney, Agent, or Firm* — Harness, Dickey & Pierce, P.L.C.

(57) ABSTRACT

In one embodiment, the method includes, receiving at least one text subtitle stream from an external source. Each text subtitle stream includes a style segment and at least one presentation segment associated with the style segment. The style segment includes at least one set of style information, and each set of style information provides region positioning information for positioning a region in an image and a text box including information for positioning a text box in the region. The presentation segment includes at least one region subtitle information, and the region subtitle information includes text subtitle data and a region style identifier. The region style identifier identifies one of the sets of style information in the style segment to apply to the text subtitle data. The text subtitle stream is decoded using style information including region positioning information and text box positioning information.

27 Claims, 29 Drawing Sheets

U.S. PATENT DOCUMENTS

| | | | |
|---|---|---|---|
| 5,519,443 | A | 5/1996 | Salomon et al. |
| 5,537,151 | A | 7/1996 | Orr et al. |
| 5,621,182 | A * | 4/1997 | Matsumoto ............... 84/610 |
| 5,758,007 | A | 5/1998 | Kitamura et al. |
| 5,781,687 | A | 7/1998 | Parks |
| 5,782,692 | A * | 7/1998 | Stelovsky ............... 463/1 |
| 5,832,530 | A | 11/1998 | Paknad et al. |
| 5,987,214 | A | 11/1999 | Iwamura |
| 6,115,077 | A | 9/2000 | Tsukagoshi |
| 6,128,434 | A | 10/2000 | Hirayama et al. |
| 6,130,722 | A * | 10/2000 | Bae et al. ............... 348/589 |
| 6,173,113 | B1 | 1/2001 | Okada et al. |
| 6,204,883 | B1 | 3/2001 | Tsukagoshi |
| 6,219,043 | B1 | 4/2001 | Yogeshwar et al. |
| 6,222,532 | B1 | 4/2001 | Ceccarelli et al. |
| 6,230,295 | B1 | 5/2001 | Watkins |
| 6,253,221 | B1 | 6/2001 | Kim |
| 6,262,775 | B1 | 7/2001 | Kim |
| 6,320,621 | B1 | 11/2001 | Fu |
| 6,393,196 | B1 | 5/2002 | Yamane et al. |
| 6,580,437 | B1 * | 6/2003 | Liou et al. ............... 715/719 |
| 6,661,467 | B1 | 12/2003 | Vam Der Meer et al. |
| 6,747,920 | B2 | 6/2004 | Denda et al. |
| 7,151,617 | B2 * | 12/2006 | Fukushima et al. ......... 358/1.16 |
| 7,174,560 | B1 | 2/2007 | Crinon |
| 7,188,353 | B1 | 3/2007 | Crinon |
| 7,712,117 | B1 * | 5/2010 | Mohr ............... 715/792 |
| 2001/0006771 | A1 * | 7/2001 | Kajiyama et al. ......... 434/307 A |
| 2002/0004755 | A1 | 1/2002 | Balthaser |
| 2002/0010924 | A1 | 1/2002 | Kalhour |
| 2002/0106193 | A1 | 8/2002 | Park et al. |
| 2002/0135608 | A1 | 9/2002 | Hamada et al. |
| 2002/0151992 | A1 | 10/2002 | Hoffberg et al. |
| 2002/0159757 | A1 | 10/2002 | Ando et al. |
| 2002/0194618 | A1 | 12/2002 | Okada et al. |
| 2003/0020834 | A1 * | 1/2003 | Gomikawa ............... 348/589 |
| 2003/0039472 | A1 | 2/2003 | Kim |
| 2003/0085997 | A1 | 5/2003 | Takagi et al. |
| 2003/0099464 | A1 | 5/2003 | Oh et al. |
| 2003/0147629 | A1 | 8/2003 | Kikuchi et al. |
| 2003/0188312 | A1 | 10/2003 | Bae et al. |
| 2003/0189571 | A1 | 10/2003 | MacInnis et al. |
| 2003/0189669 | A1 | 10/2003 | Bowser |
| 2003/0190147 | A1 | 10/2003 | Lee |
| 2003/0194211 | A1 | 10/2003 | Abecassis |
| 2003/0202431 | A1 | 10/2003 | Kim et al. |
| 2003/0206553 | A1 | 11/2003 | Surcouf et al. |
| 2003/0216922 | A1 | 11/2003 | Gonzales et al. |
| 2003/0235402 | A1 | 12/2003 | Seo et al. |
| 2003/0235406 | A1 | 12/2003 | Seo et al. |
| 2004/0001699 | A1 | 1/2004 | Seo et al. |
| 2004/0003347 | A1 | 1/2004 | Saidenberg et al. |
| 2004/0027369 | A1 | 2/2004 | Kellock et al. |
| 2004/0047605 | A1 | 3/2004 | Seo et al. |
| 2004/0054771 | A1 | 3/2004 | Roe et al. |
| 2004/0081434 | A1 | 4/2004 | Jung et al. |
| 2004/0151472 | A1 | 8/2004 | Seo et al. |
| 2005/0013207 | A1 | 1/2005 | Tsumagari et al. |
| 2005/0105888 | A1 | 5/2005 | Hamada et al. |
| 2005/0147387 | A1 | 7/2005 | Seo et al. |
| 2006/0013563 | A1 | 1/2006 | Adolph et al. |
| 2006/0098936 | A1 | 5/2006 | Ikeda et al. |
| 2006/0156358 | A1 | 7/2006 | Adolph et al. |
| 2006/0259941 | A1 | 11/2006 | Goldberg et al. |
| 2009/0089840 | A1 * | 4/2009 | Shusman ............... 725/51 |

FOREIGN PATENT DOCUMENTS

| | | |
|---|---|---|
| CN | 1864220 | 11/2006 |
| EP | 0737016 | 10/1996 |
| EP | 0863509 | 9/1998 |
| EP | 0971536 | 1/2000 |
| EP | 0755161 | 10/2001 |
| EP | 1178691 | 2/2002 |
| EP | 1326451 | 7/2003 |
| GB | 1586431 | 3/1981 |
| JP | 05-067089 | 3/1993 |
| JP | 09-102940 | 4/1997 |
| JP | 11-252518 | 9/1999 |
| JP | 2000-324395 | 11/2000 |
| JP | 2002-290895 | 10/2002 |
| JP | 2003-061098 | 2/2003 |
| JP | 2003-173629 | 6/2003 |
| JP | 2003-224826 | 8/2003 |
| JP | 2003-230136 | 8/2003 |
| KR | 10-2001-0001725 | 1/2001 |
| KR | 10-2002-0043812 | 6/2002 |
| KR | 10-2003-0030554 | 4/2003 |
| RU | 2005/137185 | 8/2006 |
| TW | 578068 | 3/2004 |
| WO | WO 03/105152 | 12/2003 |
| WO | WO 2004/036574 | 4/2004 |
| WO | WO 2005-034122 | 4/2005 |
| WO | WO 2005/045833 | 5/2005 |
| WO | WO 2005/079171 | 9/2005 |
| WO | WO 2005/083708 | 9/2005 |
| WO | WO 2005/104666 | 11/2005 |

OTHER PUBLICATIONS

International Search Report dated Nov. 9, 2005.
Understanding SAMI 1.0, *Microsoft Corp.* XP007902747 (pub. Oct. 2001, updated Feb. 2003).
English translation of Taiwanese Office Action dated Apr. 30, 2008 issued in corresponding Taiwanese Application No. 093133428.
Article from www.useit.com/alertbox: *Jakob Nielsen's* Alertbox for Jul. 1, 1997: "Effective Use of Style Sheets".
Office Action for corresponding Russian Application No. 2006142693 dated May 25, 2009.
Russian Notice of Allowance dated Oct. 2, 2009.
Japanese Office Action dated Sep. 28, 2010.
Japanese Office Action dated Jan. 25, 2011.
European Office Action dated Feb. 25, 2011.
XP0014001876, Final Draft ETSI EN 300 743 V1.2.1 (Jun. 2002), "Digital Video Broadcasting (DVB); Subtitling systems." European Broadcasting Union, 2002.

* cited by examiner

FIG. 7

Dialog Presentation Unit (DPU)

| Region style linking | Timing (PTS set) | Text data | Inline style | |
|---|---|---|---|---|
| Region_style_id = k | start_PTS end_PTS | Text #1 | Inline style | } DPU#1 |
| Region_style_id = k | start_PTS end_PTS | Text #1 | Inline style | Region1 ⎫ |
| Region_style_id = n | start_PTS end_PTS | Text #2 | Inline style | Region2 ⎭ DPU#2 |
| Region_style_id = n | start_PTS end_PTS | Text #2 | Inline style | } DPU#3 |
| Region_style_id = m | start_PTS end_PTS | Text #3 | Inline style | } DPU#4 |
| ... | ... | ... | ... | |

Dialog Style Unit (DSU)

| Region style id | Style Info |
|---|---|
| 1 | Region style set #1 (User changeable style set) |
| ... | ... |
| k | Region style set #k (User changeable style set) |
| n | Region style set #n (User changeable style set) |
| m | Region style set #m (User changeable style set) |
| ... | ... |
| 60 | Region style set #60 (User changeable style set) |

FIG. 8

```
Text_Subtitle_stream () {
      dialog_style_unit()
      while (processed_length < end_of_file){
            dialog_presentation_unit ()
      }
}
```

FIG. 9

```
dialog_style_unit () {
      unit_type
      reserved
      unit_length
      dialog_styleset()
}
```

FIG. 10A

```
dialog_styleset () {
      player_style_flag
      reserved
      number_of_region_styles
      number_of_user_styles
      for (region_style_id=0;
      region_style_id<number_of_region_styles; region_style_id++) {
            region_style() {
                  region_info() {
                        region_horizontal_position
                        region_vertical_position
                        region_width
                        region_height
                        region_bg_color_entry_id
                  }
                  text_box_horizontal_position
                  text_box_vertical_position
                  text_flow
                  text_alignment
                  text_box_width
                  text_box_height
                  line_space
                  font_id
                  font_style
                  font_size
                  font_color_entry_id
            }
            user_changeable_styleset()
      }
   palette ()
 }
```

FIG. 10B

```
user_changeable_styleset () {
    for(user_style_id=0;
    user_style_id<number_of_user_styles;
    user_style_id++){
            User_control_style() {
            region_horizontal_position_direction
            region_horizontal_position_delta
            region_vertical_position_direction
            region_vertical_position_delta
            font_size_inc_dec
            font_size_delta
            text_box_horizontal_position_direction
            text_box_horizontal_position_delta
            text_box_vertical_position_direction
            text_box_vertical_position_delta
            text_box_width_inc_dec
            text_box_width_delta
            text_box_height_inc_dec
            text_box_height_delta
            line_space_inc_dec
            line_space_delta

}
    }
```

Text_flow : Top → Bottom
Text_alignment : Top(0x01) / Center(0x02) / Bottom (0x03)

FIG. 13A

```
dialog_styleset () {
      player_style_flag
      reserved
      number_of_region_styles
      number_of_user_styles
      for (region_style_id=0;
      region_style_id<number_of_region_styles; region_style_id++) {
            region_style() {
                  region_info() {
                        region_horizontal_position
                        region_vertical_position
                        region_width
                        region_height
                        region_bg_color_entry_id
                  }
                  text_flow
                  text_alignment
                  Padding-top
                  Padding-bottom
                  Padding-left
                  Padding-right
                  line_space
                  font_id
                  font_style
                  font_size
                  font_color_entry_id
            }
            user_changeable_styleset()
      }
      palette ()
}
```

FIG. 14A

```
dialog_styleset () {
    player_style_flag
    reserved
    number_of_region_styles
    number_of_user_styles
    for (region_style_id=0;
    region_style_id<number_of_region_styles; region_style_id++) {
        region_style() {
            region_info() {
                region_horizontal_position
                region_vertical_position
                region_width
                region_height
                region_bg_color_entry_id
            }
            text_horizontal_position
            text_vertical_position
            text_flow
            text_alignment ─────► ┌ 0x01 : Left(or Top)
            line_space             { 0x02 : Center
            font_id                └ 0x03 : Right(or Bottom)
            font_style
            font_size
            font_color_entry_id
        }
        user_changeable_styleset()
    }
    palette ()
}
```

METHODS AND APPARATUSES FOR MANAGING REPRODUCTION OF TEXT SUBTITLE DATA

DOMESTIC PRIORITY INFORMATION

This application claims the benefit of the U.S. Provisional Application No. 60/566,923, filed on May 3, 2004, in the name of inventors Jea Yong YOO, Byung Jin KIM, and Kang Soo SEO, entitled "Method For Positioning TXT BOX Of High Density Optical Disc In Video Plane", which is hereby incorporated by reference in its entirety.

This is a continuation application of application Ser. No. 11/118,332 filed May 2, 2005 now U.S. Pat. No. 7,571,386, the entire contents of which are hereby incorporated by reference.

FOREIGN PRIORITY INFORMATION

This application claims the benefit of the Korean Application No. 10-2004-0035188, filed on May 18, 2004, which is hereby incorporated by reference in its entirety.

BACKGROUND OF THE INVENTION

1. Field of the Invention

The present invention relates to a recording medium and methods and apparatuses of recording and reproducing from the recording media.

2. Discussion of the Related Art

An optical disk has been widely used as an optical recording medium to record large amounts of data. Recently, a blu-ray disc (BD) has been introduced as a high density digital video disc (HD-DVD) for recording high definition video data and superior sound quality audio data for many hours.

The BD has been spotlighted as a next generation of HD-DVD and as a next generation optical recording solution for storing more data than a conventional DVD. Standardizing technical specifications of the BD has been in progress.

Accordingly, an optical recording apparatus for the BD has been developed based on the technical specifications of the BD. However, there are many difficulties in developing the optical recording apparatus for the BD since the technical specifications of the BD are not completely standardized.

For effectively reproducing data recorded in the BD and/or for a user's convenience, various auxiliary data (AUX data) such as text subtitle information may be provided along with the main AV data. Also, the information should be managed effectively for reproducing the main AV data and sub- or auxiliary data.

However, unified standards for the auxiliary data such as a text subtitle have not been completely provided. Therefore, there are many obstacles to develop the optical recording apparatus for the BD.

SUMMARY OF THE INVENTION

The present invention relates to a method of reproducing text subtitle streams.

In one embodiment, the method includes, receiving at least one text subtitle stream from an external source. Each text subtitle stream includes a style segment and at least one presentation segment associated with the style segment. The style segment includes at least one set of style information, and each set of style information provides region positioning information for positioning a region in an image and a text box including information for positioning a text box in the region. The presentation segment includes at least one region subtitle information, and the region subtitle information includes text subtitle data and a region style identifier. The region style identifier identifies one of the sets of style information in the style segment to apply to the text subtitle data. The text subtitle stream is decoded using style information including region positioning information and text box positioning information.

Another embodiment of the method includes selecting at least one text subtitle stream from an external source or a recording medium. Each text subtitle stream includes a style segment and at least one presentation segment associated with the style segment. The style segment includes at least one set of style information, and each set of style information provides region positioning information for positioning a region in an image and a text box including information for positioning a text box in the region. The presentation segment includes at least one region subtitle information. The region subtitle information includes text subtitle data and a region style identifier. The region style identifier identifies one of the sets of style information in the style segment to apply to the text subtitle data. The text subtitle stream is decoded using style information including region positioning information and text box positioning information.

The present invention also relates to a method of recording text subtitle streams.

One embodiment of this method includes, receiving at least one text subtitle stream from an external source. Each text subtitle stream includes a style segment and at least one presentation segment associated with the style segment. The style segment includes at least one set of style information. Each set of style information provides region positioning information for positioning a region in an image and a text box including information for positioning a text box in the region. The presentation segment includes at least one region subtitle information, and the region subtitle information includes text subtitle data and a region style identifier. The region style identifier identifies one of the sets of style information in the style segment to apply to the text subtitle data. The received text subtitle stream are recorded in a recording medium.

The present invention further relates to apparatus for reproducing and/or recording a text subtitle stream.

BRIEF DESCRIPTION OF THE DRAWINGS

The accompanying drawings, which are included to provide a further understanding of the invention and are incorporated in and constitute, a part of this application, illustrate embodiment(s) of the invention and together with the description serve to explain the principle of the invention. In the drawings:

FIG. 7 illustrates a dialog style unit (DSU) and a dialog presentation unit (DPU) included in a text subtitle stream in accordance with an example embodiment of the present invention;

FIGS. 8 and 9 show the syntax of a text subtitle stream in accordance with an example embodiment;

FIGS. 10A to 12C show the syntax of a dialog style unit in a text subtitle stream in accordance with a first embodiment of the present invention;

FIGS. 13A and 13B show the syntax of a dialog style unit in a text subtitle stream in accordance with a second embodiment of the present invention;

FIGS. 14A to 14G show the syntax of a dialog style unit in a text subtitle stream in accordance with a first embodiment of the present invention;

DETAILED DESCRIPTION OF EXAMPLE EMBODIMENTS

Reference will now be made in detail to example embodiments of the present invention, which are illustrated in the accompanying drawings. Wherever possible, the same reference numbers will be used throughout the drawings to refer to the same or like parts.

In the present invention, a main data is title information recorded in an optical disk and includes video and audio data which are provided to a user from a disk author. Generally, the video and audio data is recorded based on the MPEG2 format and is called as a main AV stream or main data.

Auxiliary data represents data related to the main data that is provided to a user for conveniently reproducing the main data. The auxiliary data includes subtitle information, interactive graphic stream, presentation graphic stream, sound information and additional audio data having a browserble slide show. According to characteristics of the auxiliary data, the auxiliary data are recorded based on a MPEG2 format by multiplexing with the main AV stream or the auxiliary data are recorded as stream files independent from the main AV stream based on the MPEG2 format or any other suitable formats.

The subtitle as the auxiliary data is generally a closed caption displayed at a predetermined region of a display with video images generated by reproducing a main AV data. When a user wants to reproduce a main AV data with a subtitle in a desired language, the language of the subtitle is displayed at a region of the display with the video image by selecting the language of the subtitle among subtitles in various languages provided by the optical disk. Accordingly, the subtitle may be provided in various formats. Specially, a subtitle recorded with text data is a text subtitle.

Hereinafter, a recording format of the main data and the auxiliary data including the text subtitle data recorded in the optical disk and a file structure for managing the main data and the auxiliary data will be explained in detail by referring to FIGS. 1 and 2.

Figure 1:
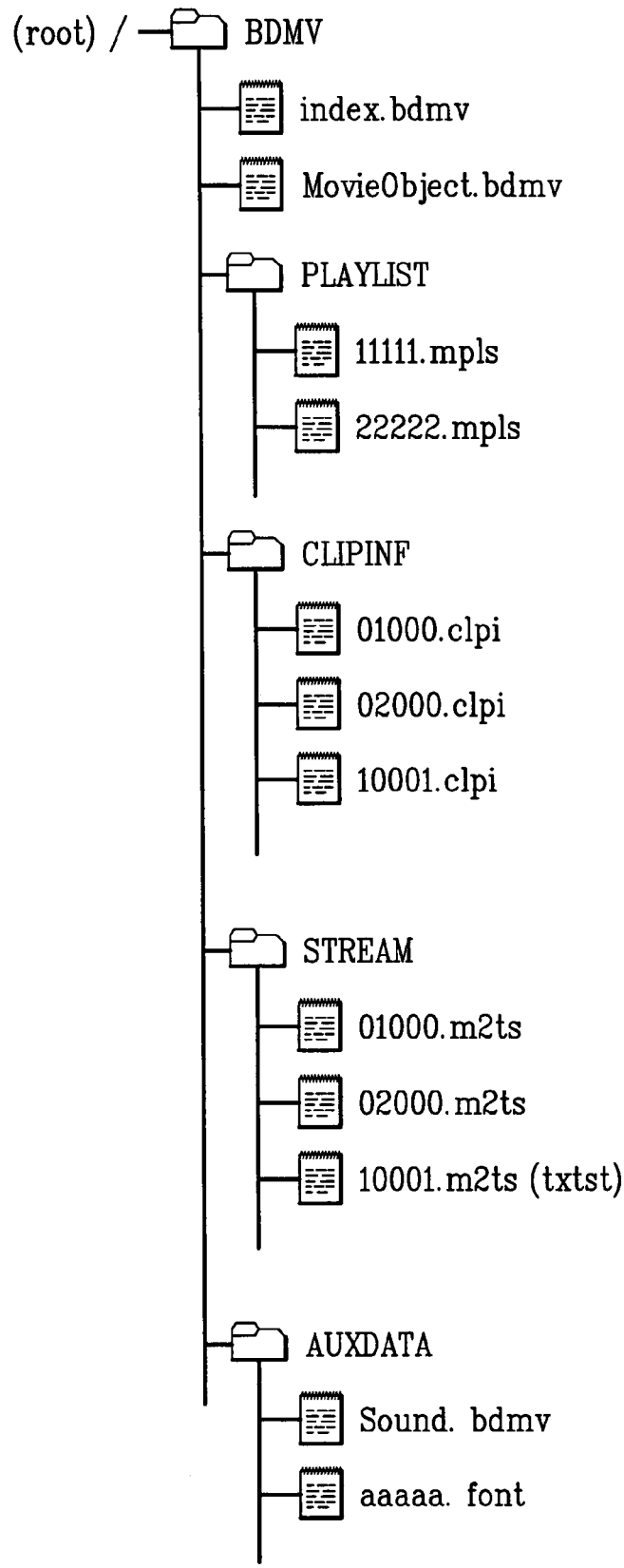
FIG. 1 illustrates a file structure of a high density optical disk in accordance with an example embodiment of the present invention.

FIG. 1 illustrates a file structure for managing various data on a disc in accordance with an example embodiment of the present invention. As shown, at least one BD directory BDMV exists beneath one root directory. In the BD directory BDMV, an index file index.bdmv and an object file MovieObject.bdmv are included as general file (upper file) information to secure interactivity with a user. Moreover, a playlist directory PLAYLIST, clipinfo directory CLIPINF, stream directory STREAM, and auxiliary data directory AUXDATA are included in the BD directory BMDV.

Files for video and audio streams, which are called 'main AV stream', recorded in a disc according to specific formats and auxiliary stream such as text subtitle (hereinafter called text subtitle stream) independently exist in the stream directory STREAM. Because the text subtitle streams files and AV stream files are recorded in the MPEG2 format (e.g., MPEG2 transport packets), '*.m2ts' is used the extension name of each stream file (e.g., 01000.m2ts, 02000.m2ts, and 10001.m2ts). Alternatively, in case of the text subtitle stream file, '*.txtst' may be used as the file extension name since the text subtitle stream has auxiliary data features different from that of the main AV stream, for example.

In the BD specifications, the AV stream may be called a clip stream file. Relating to the present invention, the text subtitle data will exist in the form of a separate file from the AV stream file. For example in FIG. 1, the text subtitle data exists as the text subtitle stream file 10001.m2ts or 10001.txtst.

The clipinfo (or clip information) directory CLIPINF includes clip information or clipinfo files *.clpi, each having a one-to-one correspondence with a stream file. A clipinfo file *.clpi has attribute information and timing information of the corresponding stream file and serves as a management file. More specifically, the information in the clipinfo file includes mapping information that enables mapping of a Presentation Time Stamp (PTS) to a Source Packet Number (SPN) of a source packet in the corresponding stream file. This map is referred to as an Entry Point Map or "EP_map".

A stream file and the corresponding clipinfo file may be called a "clip", collectively. Accordingly, the file "01000.clpi" in the clipinfo directory CLIPINF has attribute information and timing information on the file "01000.m2ts" in the stream directory STREAM, and the files "01000.clpi" and "01000.m2ts" form a clip.

The playlist directory PLAYLIST includes playlist files *.mpls, each having at least one playitem PlayItem designating a playing interval of a particular clip. The playitem PlayItem includes timing information on a play start time In-Time and play end time Out-Time of a particular clip for playback, and identifies the clip by providing the clip information file name in a Clip_Information_File_name field. Using the PTS information in the In-Time and Out-time information, the EP map of the named clipinfo file allows a particular stream address or position (e.g., SPN) of the corresponding stream file to be searched for and obtained such that reproduction of the playitem results in reproduction of the clip.

The playlist file *.mpls serves as a basic management file for playing a desired clip by providing at least one playitem PlayItem. Moreover, the playlist file *.mpls may also provide a sub-playitem SubPlayItem for managing reproduction of, for example, supplemental data, which may be reproduced synchronized or non-synchronized (e.g., a browsable slide show) with the playitem PlayItem. For instance, in case of including SubPlayItem for playing back text subtitle, the corresponding SubPlayItem is synchronized with the PlayItem to play back the data. Yet, in case of including SubPlayItem for playing back audio data for a browsable slide show, the corresponding SubPlayItem is non-synchronized with PlayItem.

In an embodiment of the present invention, auxiliary data including text subtitles is managed by SubPlayItems for example, which will be explained in detail below.

The auxiliary data directory AUXDATA is an area for separately recording auxiliary data files for the playback. For instance, in order to support more user-friendly playback, a sound file Sound.bmdv for providing a click sound, a font file *.font or *.otf employed with text subtitle playback, and the like are recorded therein.

Accordingly, the text subtitle stream 10001.m2ts, which is a kind of auxiliary data, may be recording in the auxiliary data directory AUXDATA.

Moreover, in the above-explained BD directory BDMV, the index file index.bdmv and the object file MovieObject.bdmv exist as general files to secure interactivity with a user. The index file index.bdmv has an index table providing menu information and title information the user can select. The MovieObject.bdmv provides navigation commands for, for example, executing a playlist, and may be called from a selection made in the index table.

Figure 2:
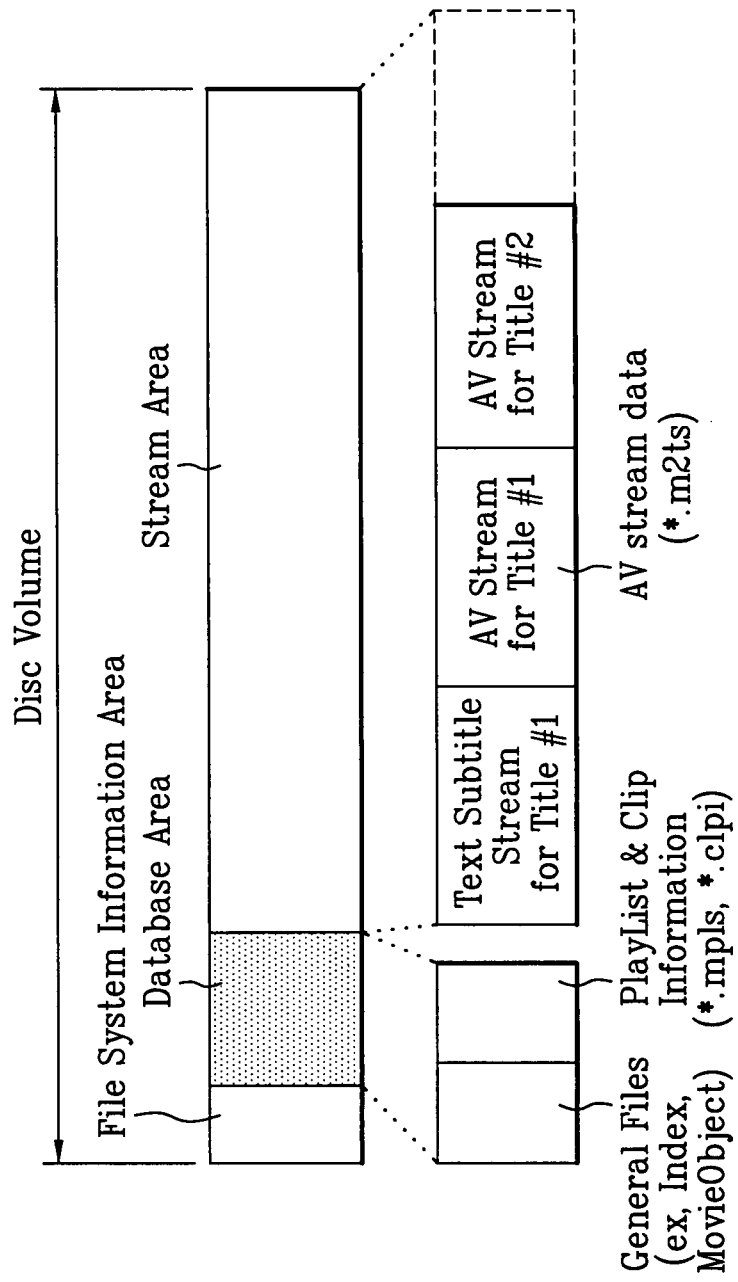
FIG. 2 illustrates a formation of a file structure and related information recorded in a high density optical disk in accordance with an example embodiment of the present invention.

FIG. 2 shows a format of the file structure and related information recorded in the optical disk. The optical disk includes a file system information area, a database area and a stream area. System information for managing files is recorded in the file system information area. In the database area, the playlist file (*.mpls) and the clip information files (*.clpi) for reproducing the recorded stream files (*.m2ts), the index file (index.bdmv), and the object file (MovieObject.bdmv) are recorded. Also, the main data and the auxiliary data are recorded in the stream area. As mentioned above, the main data includes audio, video and graphic data and the auxiliary data includes the text subtitle. Also, the auxiliary data is recorded as an independent file separate from the main data in the stream area. That is, the auxiliary data is recorded in the stream area without being multiplexed with the main data.

Accordingly, the user decides a method for reproducing the main data and the auxiliary data based on information stored in the database area and in the stream area.

Hereinafter, the file structure of a text subtitle stream file will be explained in detail. Additionally, a method for defining management information for reproducing the text subtitle, a method for constructing the file structure of the text subtitle stream file including the defined management information, and a method and an apparatus for reproducing the stream file will be explained in detail.

Figure 3:
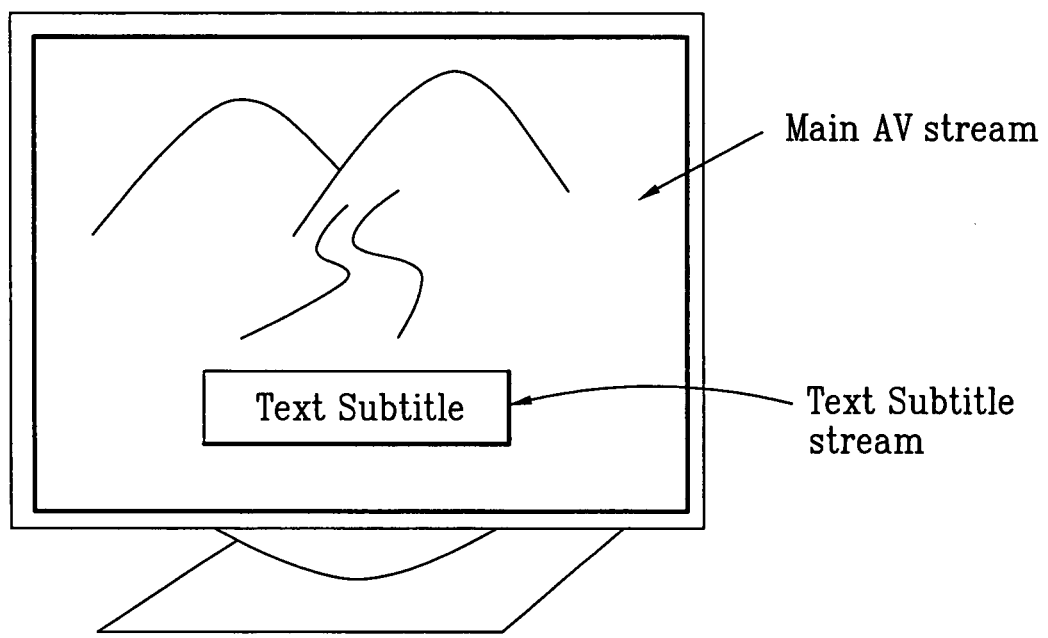
FIG. 3 shows a text subtitle stream displayed simultaneously with a main AV stream in single video frame.

FIG. 3 shows a display simultaneously displaying a text subtitle stream and the main AV stream in single video frame. That is, it shows that the text subtitle displayed with the single video frame generated by reproducing the main AV stream and timely synchronizing, in time, the text subtitle with the generated video frame.

Figure 4:
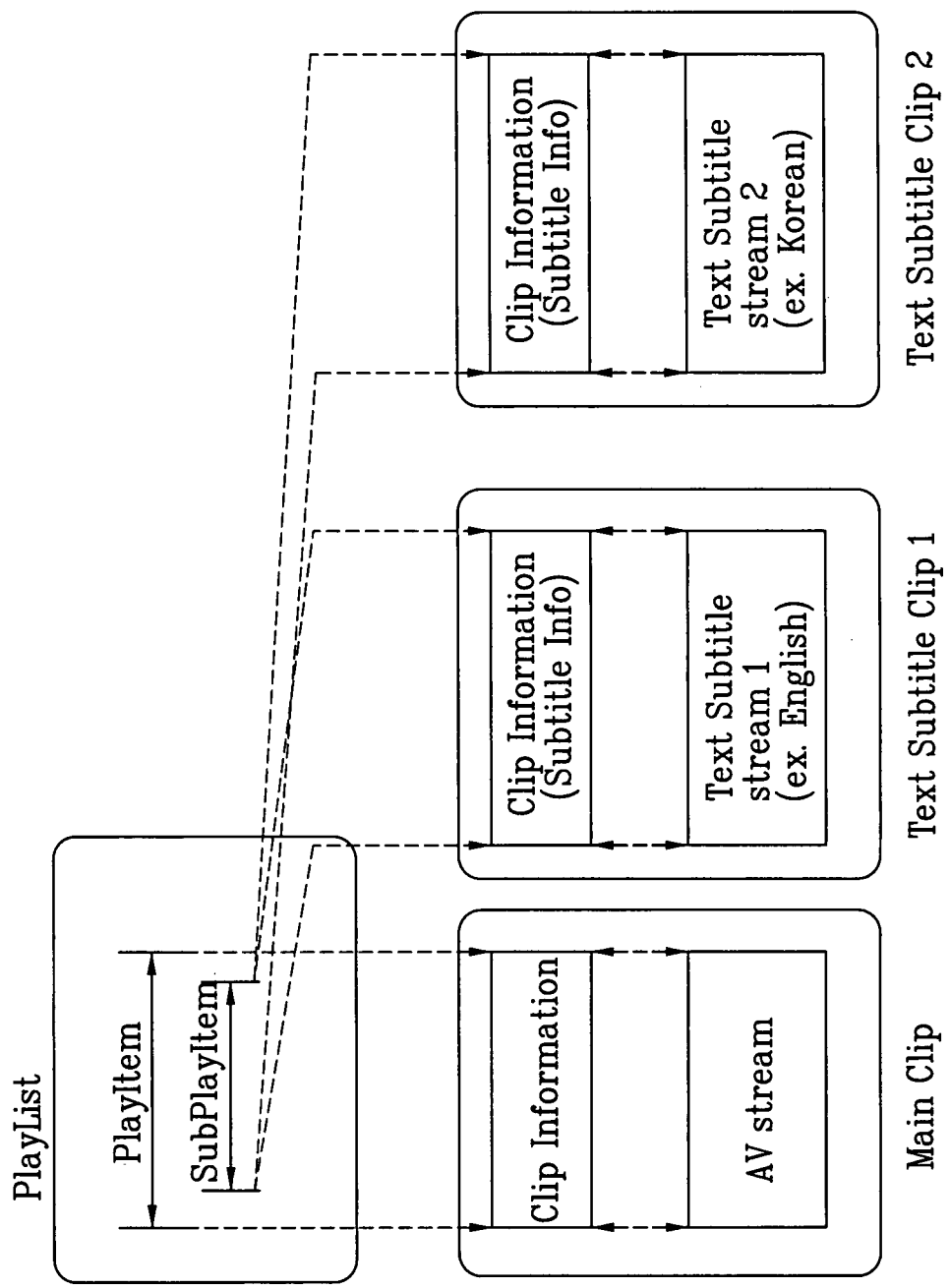
FIG. 4 is a diagram showing a file structure with file information for explaining a method for managing reproduction of a text subtitle in accordance with an example embodiment of the present invention.

FIG. 4 is a diagram showing a file structure with file information for explaining a method for managing reproduction of a text subtitle in accordance with an example embodiment of the present invention. The text subtitle is managed by a subplayitem in a playlist and one subplay item manages reproduction of a plurality of text subtitle clips.

As shown, the playlist file includes at least one or more playitems managing reproduction of the main AV clip. In case that there is one or more text subtitles related to the main AV data, the text subtitle(s) is managed as a subplay item. For example, FIG. 4 shows an English text subtitle clip 1 and a Korean subtitle clip 2 in a playlist file, and shows that subtitle clip 1 and subtitle clip 2 are synchronized, in time, with the main AV data. Namely, a subtitle clip is displayed with the main AV data at a target presentation time.

Accordingly, management information about the target presentation time, a position and a size of the subtitle are provided for reproducing the text subtitle. Hereinafter, the management information for reproducing the text subtitle will be explained in detail.

Figure 5A:
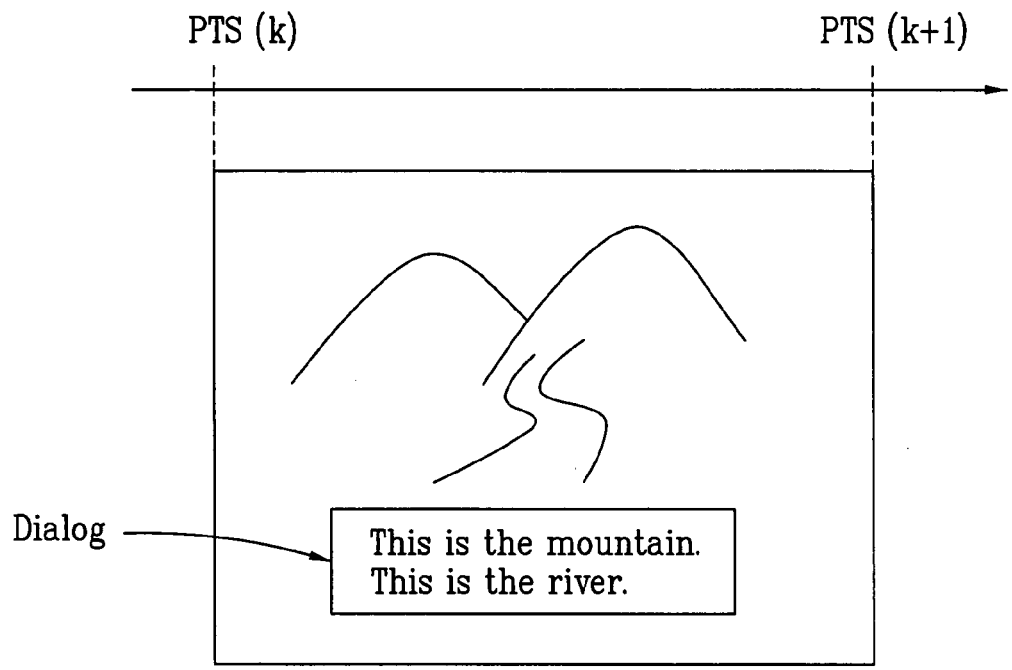
FIGS. 5A to 5C illustrate a reproduced main AV stream with a related subtitle displayed at a display for explaining management information recorded in a text subtitle stream.
Figure 5B:
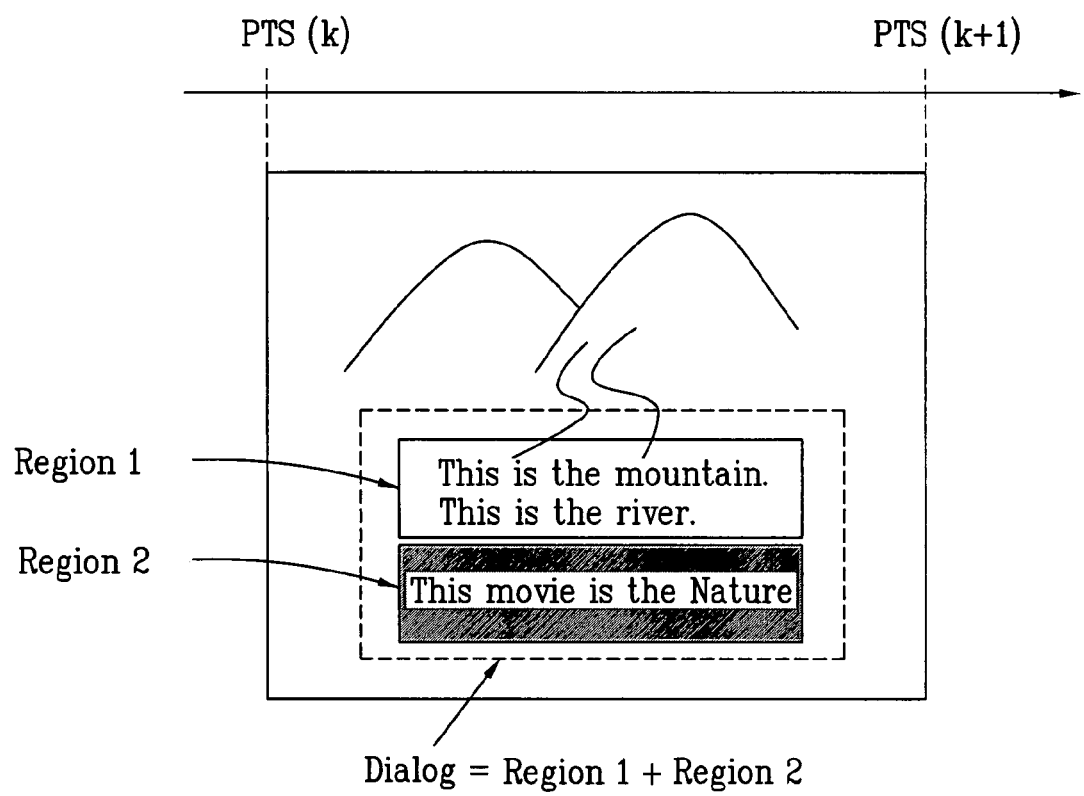
Figure 5C:
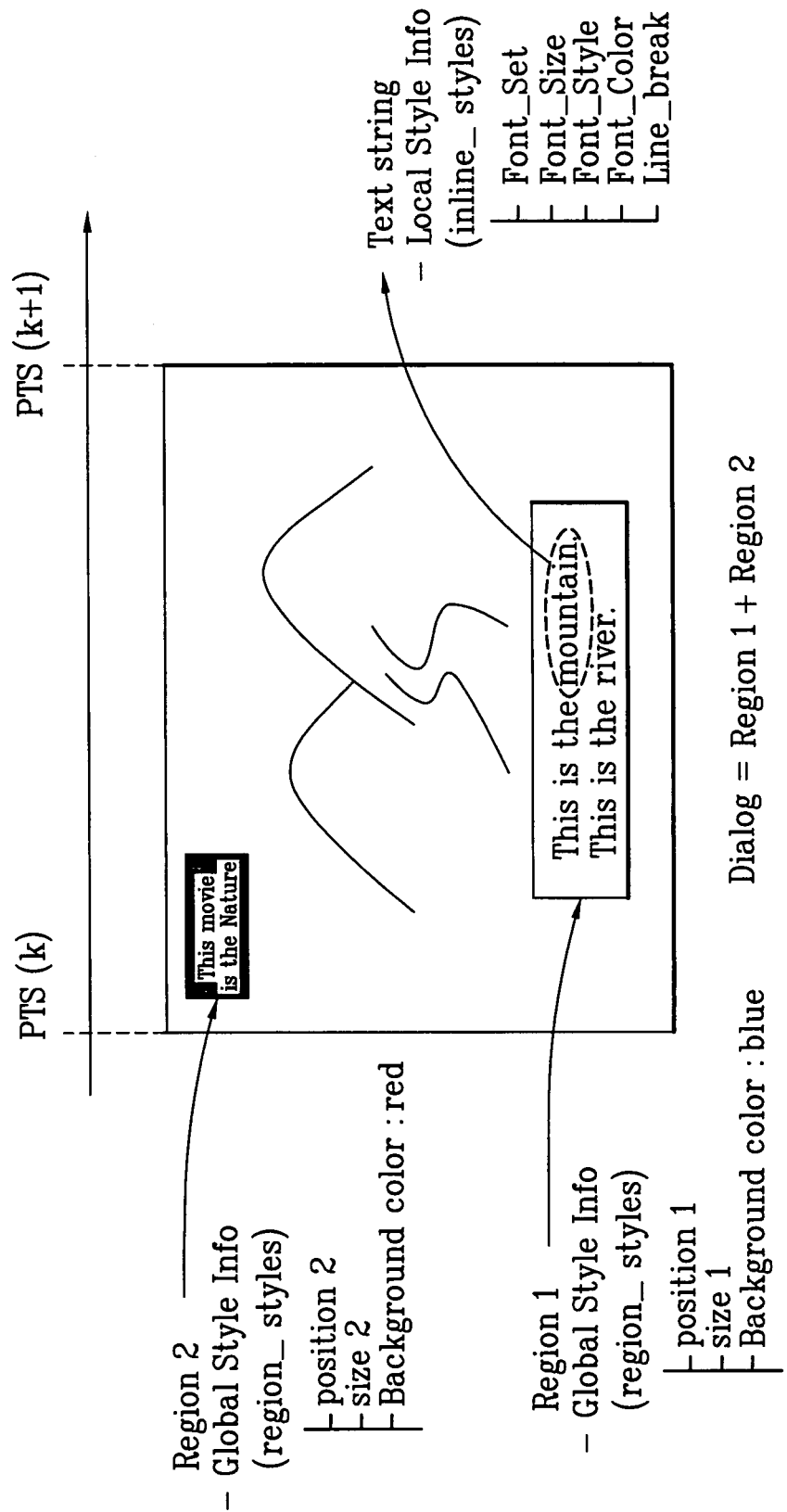

FIGS. 5A to 5C show a reproduced main AV stream with related subtitle displayed on a display for explaining management information recorded in a text subtitle stream. FIG. 5A shows dialog information, FIG. 5B shows region information and FIG. 5C shows style information.

FIG. 5A shows the dialog information as the management information for managing reproduction of the text subtitle. A dialog information is management information for managing at least one or more text data at a presentation time.

That is, the presentation time is a time for reproducing corresponding subtitle and it is expressed as PTS. By defining text subtitles displayed at a PTS as the dialog, the subtitles are conveniently managed for reproduction.

For example, if the text subtitle is displayed as two lines at PTS(k) and PTS(k+1), the text subtitle is defined as identical dialog. In one embodiment, the text subtitle data in a single dialog is less than 100 character codes.

FIG. 5B shows region information among the management information. The region is information about constructing the dialog at a presentation time. Also, the region represents a region in a single video frame where global style information is identically applied. In one embodiment, a single dialog has at most two regions. That is, in this embodiment, the dialog may be constructed with a single region or with two regions.

The reason for defining at most two regions in the single dialog is to adjust the workload of decoding when the text subtitle is reproduced. However, the number of regions may be defined as a maximum n number (n>=2) in other embodiments.

FIG. 5C shows the style information of the management information. The style information is information about assigning a method for displaying the text subtitle and includes style information such as a position of the subtitle, a size and a background color. Also, a text alignment or a text flow may be provided as the style information.

In an embodiment of the present invention, the style information is divided into global style information and local style information for displaying the text subtitle in various ways.

The global style information is style information identically applied to the regions and it includes a position of each region and a size of each region. This information may be called a region_styles. FIG. 5C shows the two different region style information (region_styles) are applied to two regions (regions #1 and #2). The region_styles of "position1, size1, color=blue" is applied to the region 1 (region #1). Also, the region_styles of "position2, size2, color=red" is applied to the region #2.

The local style information is style information applied according to each text data line in a region or according to each text data character. This information may be called "inline_styles". That is, inline_styles may be style information defined for a text data when the region_styles is modified.

For example, in FIG. 5C, "inline style information (inline_styles)" is applied to the region #1 and different inline_styles is applied to "mountain" among the text data.

Figure 6:
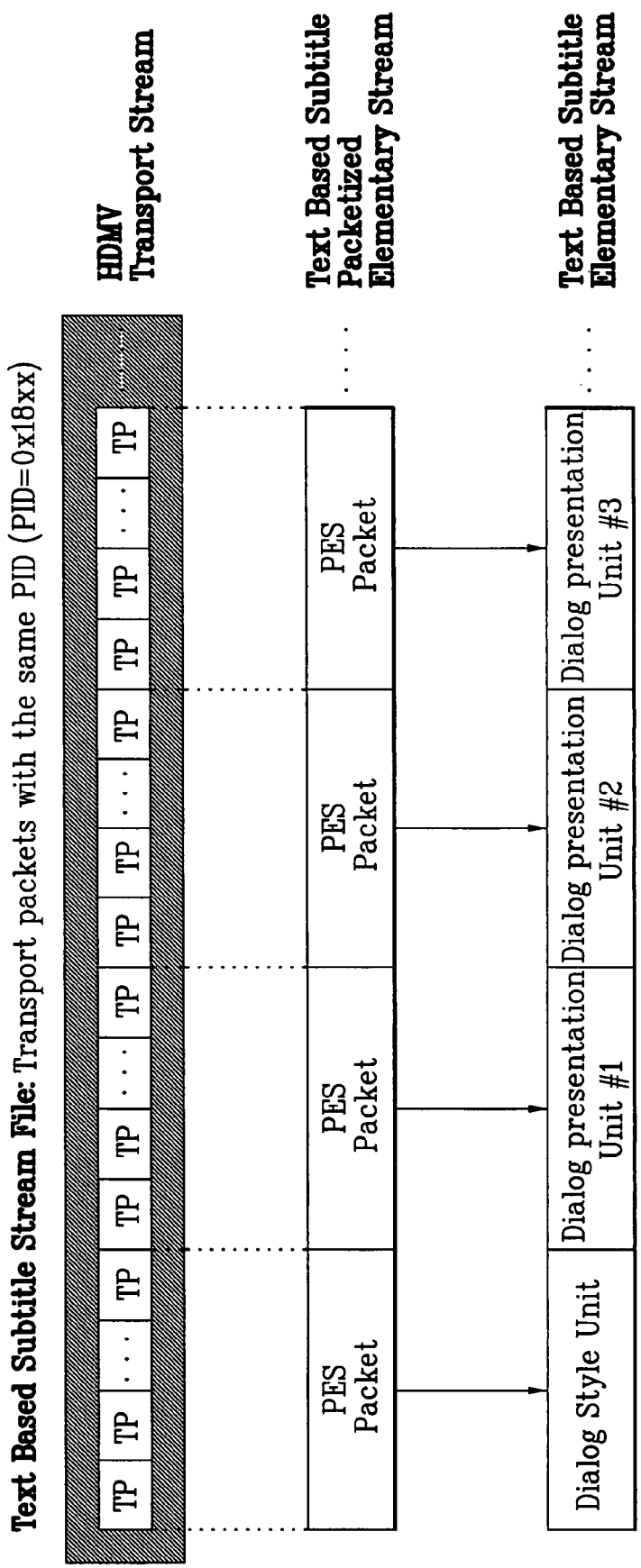
FIG. 6 illustrates a text subtitle stream file structure in accordance with an example embodiment of the present invention.

FIG. 6 illustrates a structure of a text subtitle stream file. For example, FIG. 6 shows the structure of the text subtitle stream file "10001.m2ts" of FIG. 1.

In this embodiment, the text subtitle stream is constructed as a MPEG2 transport stream. The transport stream includes a plurality of transport packets and an identical packet identifier (PID) is assigned to the transport packets (TP) such as "PID=0x18xx". Accordingly, the optical reproducing method or apparatus effectively extracts the text subtitle stream from an input stream by extracting only transport packets assigned with "PID=0x18xx".

Also, a single packet elementary stream (PES) includes a plurality of transport packets TPs. In this embodiment, a single PES is formed per each dialog and thus, the dialog is effectively reproduced.

Also, the first packet elementary stream (PES) in the text subtitle stream includes a dialog style unit DSU (alternatively referred to as a dialog style segment DSS), which includes a set of regions styles. And, the second and succeeding packet elementary streams each include a dialog presentation unit DPU (alternatively referred to as a dialog presentation segment DPS), which contains real dialog information.

Accordingly, the dialog information defined in FIGS. 5A to 5C includes the DPU, and style information of dialog information includes inline style information (inline styles) and linking information (region_style_id) linking to one of various regions styles defined in the DSU.

In one embodiment, the dialog style unit includes a maximum number of region styles sets. For example, the dialog style unit includes maximum 60 region styles sets and they are distinguished by unique region style identification (region_style_id) assigned to each region styles set.

FIG. 7 illustrates a dialog style unit (DSU) and a dialog presentation unit (DPU) included in a text subtitle stream in accordance with an example embodiment of the present invention. The syntax of the text subtitle stream will be explained later with respect to FIG. 8.

In this embodiment, the dialog style unit (DSU) includes a maximum of 60 region styles sets and the regions styles sets are distinguished by the region style identification (region_style_id). The region style set includes various region styles and a user changeable style set, and the region style sets are recorded according to the region style identification. The syntaxes for region style information and the user changeable style set will be explained in detail below with respect to FIG. 10A.

The dialog presentation unit (DPU) includes text data and PTS set, which is a set of presentation times of the text data. The DPU also includes style information applied to each region. Therefore, the DSU includes region_style_id for linking region style information to a corresponding region.

As shown in FIG. 7, DPU #1 includes dialog presentation information of single region. A region style applied to text data #1 is region style set #k in the DPU since the DPU #1 includes the Region_style_id=k for linking the DPU #1 To the corresponding region style set. The DPU #2 include two regions. The first region of text data #1 is assigned with a region style set #k (Region_style_id=k). Also, a region style #n is applied to the text data #2 of the second region since the region style linking information of the region2 of the DPU #2 is Region_style_id=n. Similarly, region style set #n and region style set #m are applied to DPU #3 and DPU #4, respectively.

The style information linked by the region_style_id is identically applied to the text data in corresponding region, which is the global style information. In case that a text string in the text data is modified according to special style information, local style information is applied to the corresponding text string.

Hereinafter, the syntaxes of the DSU and the DPU will be explained.

FIG. 8 shows the syntax of a text subtitle stream (Text_Subtitle_stream( )) in accordance with an example embodiment. As shown in FIG. 8, the text subtitle stream (Text_Subtitle_stream( )) includes a single DSU (dialog_style_unit( )) defining a style information set and a plurality of DPUs (dialog_presentation_unit( )) containing dialog information. That is, a function Text_Subtitle_stream( ) includes a function dialog_style_unit( ) and a function dialog_presentation_unit( ). The text subtitle stream is recorded by the function Text_Subtitle_stream( ) and the recorded text subtitle stream is constructed with a single DSU defined by the function dialog_style_unit( ) and a plurality of the DPUs defined by the function dialog_presentation_unit( ).

FIG. 9 shows the syntax of a dialog style unit (DSU). As mentioned above, the DSU is defined by the function dialog_style_unit( ) and FIG. 9 shows a detailed structure of the function dialog_style_unit( ). As shown in FIG. 9, the dialog_style_unit( ) includes a function dialog_styleset( ). The function dialog_styleset( ) defines a style information set corresponding to the dialog. Accordingly, the DSU includes style information set having various style information for the corresponding dialog.

Hereinafter, various embodiments of the present invention for defining the style information set (dialog_styleset( )) will be explained. The embodiments are divided according to a method for defining a standard position of text data and a size of the dialog. FIGS. 10A to 12C show functions and diagrams for explaining a first embodiment, FIGS. 13A to 13C illustrate functions and diagrams for explaining a second embodiment and FIGS. 14A to 14G depict functions and diagrams for explaining a third embodiment.

FIG. 10A to FIG. 12C shows functions and diagrams for defining a style information set of a dialog by a function dialog_styleset( ) in accordance with a first embodiment of the present invention. The first embodiment for defining the style information set is characterized by defining text box information assigning a size and a reference position of the text data in a region.

FIG. 10A shows a detailed structure of the dialog_styleset( ) syntax defined in the function dialog_style_unit( ) of FIG. 9 in accordance with the first embodiment of the present invention. In the function dialog_styleset( ), a flag player_style_flag, a number_of_region_styles, a number_of_user_styles, a function user_changeable_styleset( ) and a function palette( ) are provided in addition to a function a region_style( ) for defining region style information of a dialog. The flag player_style_flag indicates whether modification of style information by a user is allowed and the function user_chageable_styleset( ) provides a modification range of the style information. The function palette( ) provides color information.

The region style information is the global style information defined according to each region as mentioned above. A unique identification (region_style_id) is assigned to each of region style information. Therefore, the region style information of the dialog is provided based on a style information set corresponding to the assigned identification region_style_id.

Accordingly, by recording the identification region_style_id applied to the dialog in the DPU, the dialog is reproduced by applying the style information set defined based on the identical region_style_id in the dialog_styleset( ) when the dialog is produced.

Hereinafter, the style information (Style Info) included in the style information set provided according to the region_style_id will be explained.

At first, as information for defining a position and a size of corresponding region in a image frame, region_horizontal_position, region_vertical_position, region_width and region_height are provided. Also, region_bg_color_entry_id is provided for defining a background color of the corresponding region.

Secondly, text box information is provided for representing a size of a text box in the corresponding region. The text box represents a region where the text data is displayed in the corresponding region.

The size of the text box is set forth by text_box_width and the_box_height. An origin of the corresponding text box in a region is provided by text_box_horizontal_position and text_box_vertical_position.

Furthermore, text_flow is defined for defining a direction for displaying text and text_alignment is defined for defining a direction for aligning text such as right, left and middle. In case of text_flow, each region in the corresponding dialog is defined to have identical text_flow when there are plural of regions in the dialog for preventing confusion of the user.

By referring to FIGS. 11A to 12C, provision of the text box information according to the text_flow and the text_alignment will be explained in detail below.

A line_space is defined for controlling the space between lines in a corresponding region as style information included in the style information set. Also, a font_id, a font_style, a font_size and a font_color_entry_id are defined as font information for controlling text data in the corresponding region.

The player_style_flag in the dialog_styleset( ) is information representing whether style information of a reproducing apparatus is applicable. For example, if the player_style_flag is set as 1b (player_style_flag=1b), it allows use of the style information of the reproducing apparatus for reproducing the text subtitle besides using style information defined in the dialog_styleset( ). If the player_style_flag is set as 0b (Player_style_flag=0b), the text subtitle is reproduced by only using the style information defined by the dialog_styleset( ).

FIG. 10B shows the function "user_changeable_styleset( )" defined in the function "dialog_styleset( )" in FIG. 10A.

By referring to FIG. 10B, the function user_changeable_styleset( ) defines types and a modification range of style information which can be modified by a user. Accordingly, the function "user_changeable_styleset( )" is used for conveniently modifying the style information of the text subtitle data by the user.

However, in this embodiment, the style information modifiable by the user is limited to a size of a font and a position of a region. Therefore, region_horizontal_position_direction, region_horizontal_position_delta, region_vertical_position_direction, region_vertical_position_delta, font_size_inc_dec and font_size_delta are defined in the function user_changeable_styleset( ). Since a position of a text box and a space between lines are changed according to increase/decrease of a font size, variables for defining the line space and the text box position are defined in the function user_changeable_styleset( ).

As mentioned above, the function user_changeable_styleset( ) is defined according to the region_style_id and a plurality of user modification style information (user_style_id) are defined in the function user_changeable_styleset( ). For example, if the function user_changeable_styleset( ) is defined according to the regions_style_id=k, a maximum of 25 user modification style information are defined in the defined function user_changeable_styleset( ) in this example embodiment.

The region_horizontal_position_direction and the region_vertical_position_direction are provided for defining a direction of moving a region_horizontal_position and a region_vertical_position, which can be modified according to the user_style_id. Also, the region_horizontal_position_delta and region_vertical_position_delta are provided for defining a one time modification for moving a region in each direction in a modification amount of a pixel unit.

For example, if the region_horizontal_position_direction is defined as 0, the corresponding region is moved to right. If the region_horizontal_position_direction is defined as 1, the corresponding region is moved to left. Also, if the region_vertical_position_direction is defined as 0, the corresponding region is moved down. If the region_vertical_position_direction is defined as 1, the corresponding region is moved up.

Also, a font_size_inc_dec is provided for defining a direction of increasing/decreasing of the font size, which is changeable according to the user_style_id; and a font_size_delta is provided for assigning a one time modification amount of the font_size in a unit of a pixel.

For example, if the font_size_inc_dec is defined as 0, it means increase the font_size and if the font_size_inc_dec is defined as 1, it means decrease the font_size.

Furthermore, a text_box_horizontal_position and a text_box_vertical_position are provided for defining a reference position of the text box changed according to the increase/decrease of the font_size. The text_box_horizontal_position and the text_box_vertical_position may be defined by an identical method providing the region_horizontal_position and the region_vertical_position. For example, the text_box_horizontal_position and the text_box_vertical_position are recorded for assigning the changing direction and a text_box_horizontal_position_delta and a text_box_vertical_position_delta are recorded for assigning one time modification amount in a unit of a pixel.

Also, a text_box_width and a text_box_height, which are changed according to increase/decrease of the font_size, may be provided identically to the above mentioned case of the font_size. For example, a text_box_width_inc_dec and a text_box_height_inc_dec are recorded for assigning an increase/decrease direction, and a text_box_width_delta and a text_box_height_delta are recorded for assigning a one time modification amount in a unit of a pixel.

Moreover, increase/decrease of a text line space (line_space), which is changed according to increase/decrease of the font_size, may be defined identically to the method defining increase/decrease of the font_size. That is, a line_space_inc_dec and a lint_space_delta are recorded.

Figure 11A:
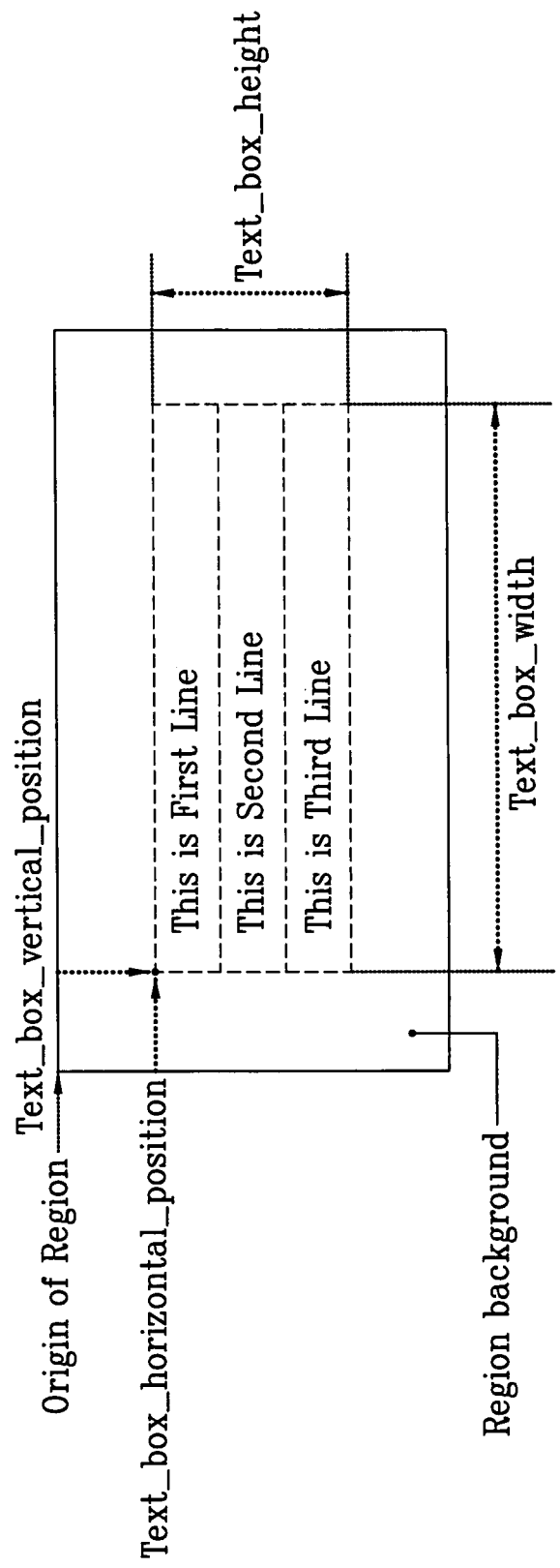
Figure 11B:
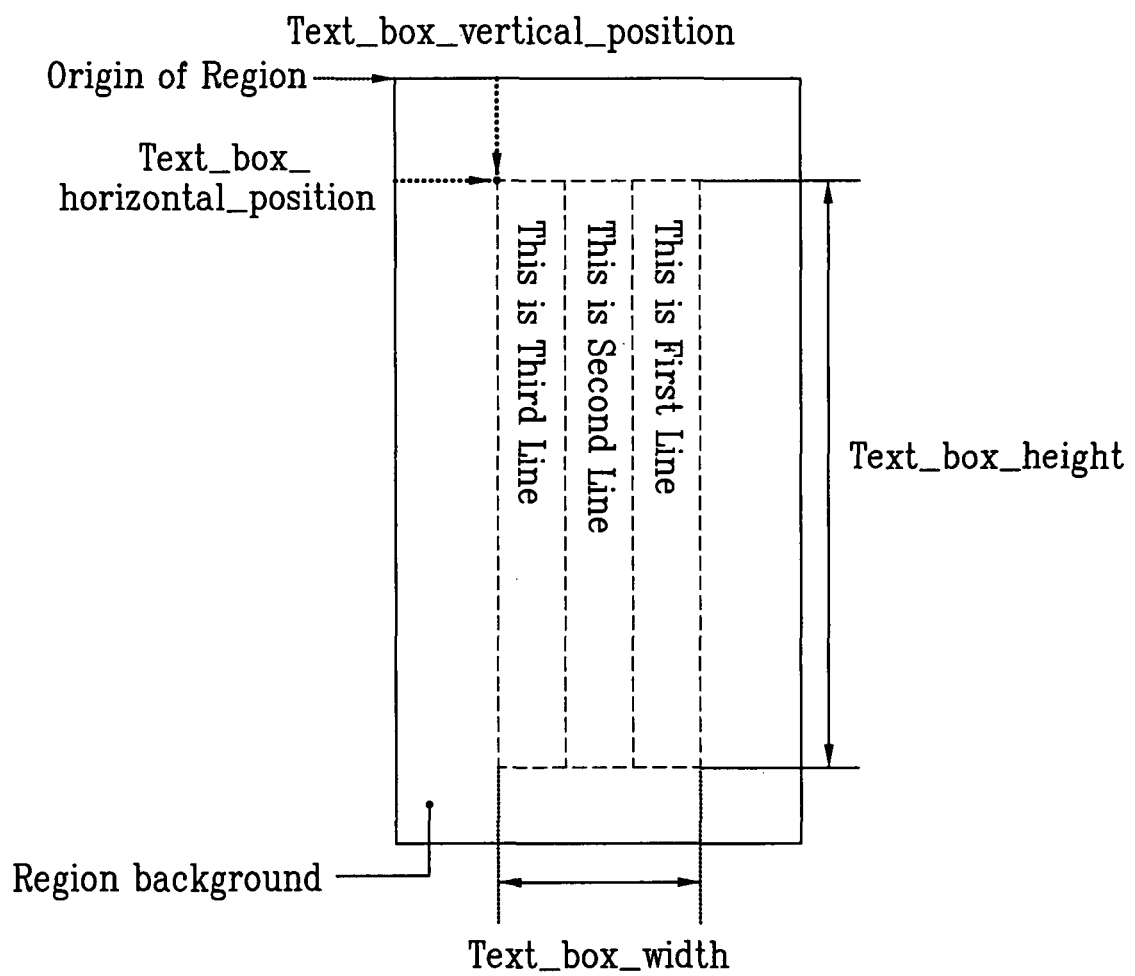

FIGS. 11A and 11B show examples of displaying a text box according a text_box_horizontal_position, a text_box_vertical_position and a text_flow defined according to the first embodiment of the present invention shown in FIG. 10A.

That is, FIG. 11A shows that the text_box_horizontal_position, the text_box_vertical_position and the text_flow are defined to display the text data with respect to the origin of the region (e.g., offset from the origin of the region) and without respect to the text_flow. In this case, an origin of the text data becomes the left-top (also referred to as the upper left corner) of the text box without respect to the text alignment or text_flow.

FIG. 11B shows the display of text data in a textbox based on the text_box_horizontal_position, the text_box_vertical_position and the text_flow when the text_flow is top to bottom.

As with the previous embodiment of FIG. 11A, the textbox is defined with respect to the origin of the region. In this case, an origin of the text data becomes the left-top of the text box without respect to the text alignment.

Figure 12A:
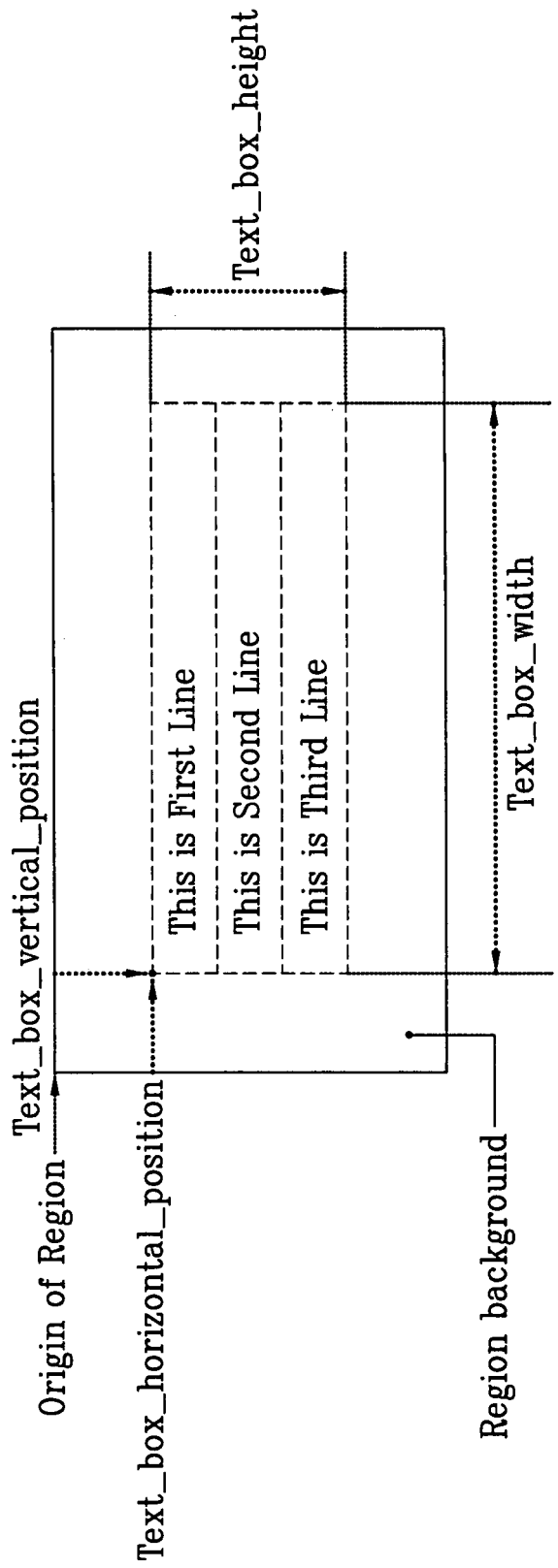
Figure 12B:
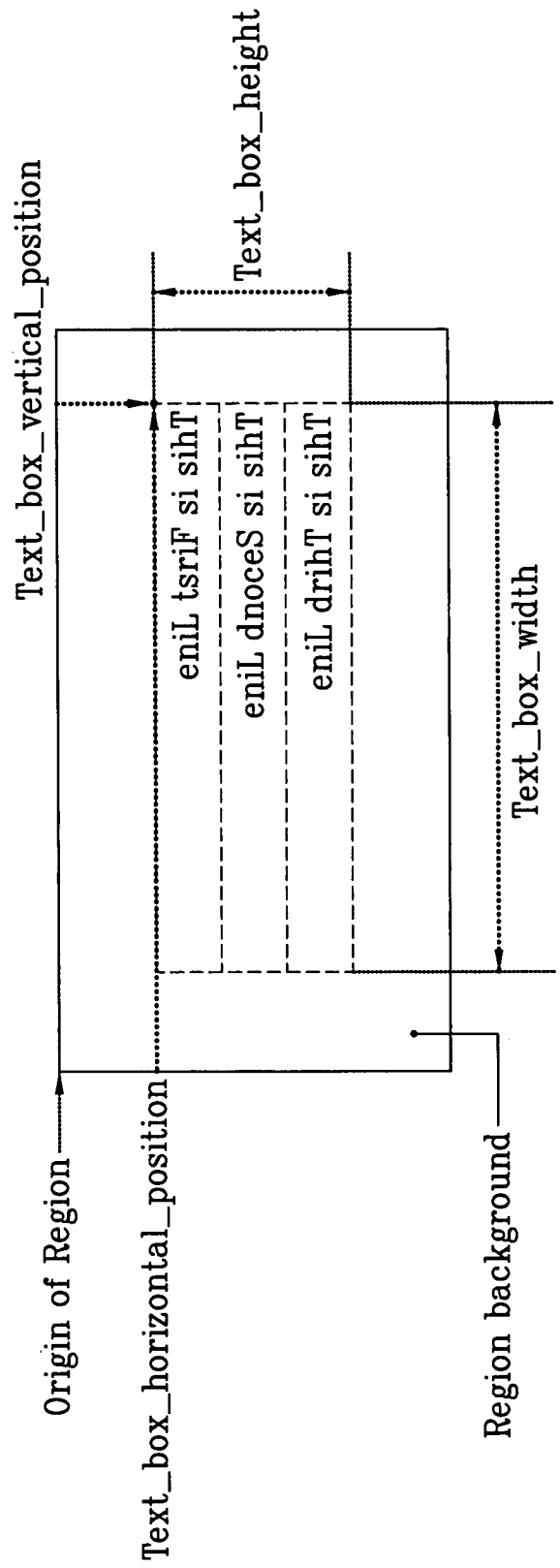
Figure 12C:
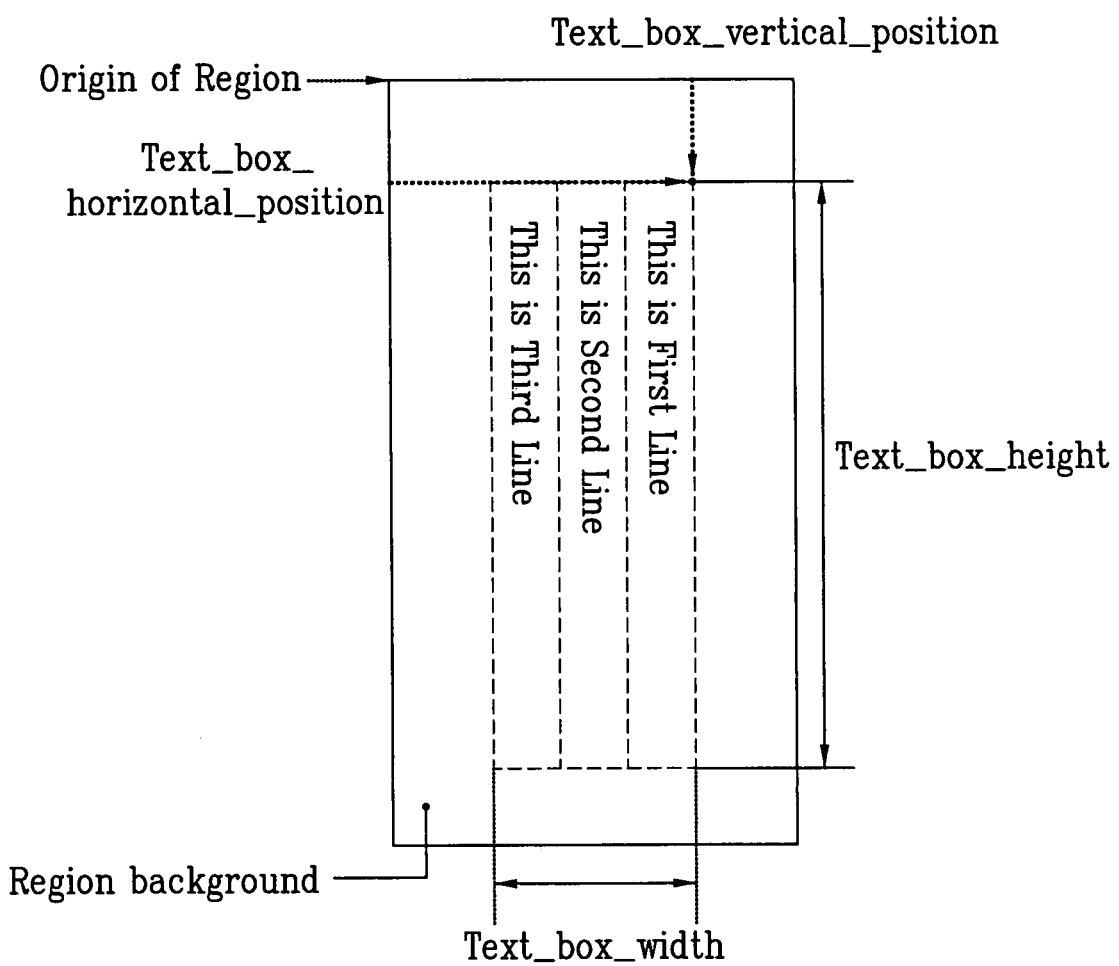
Figure 13B:
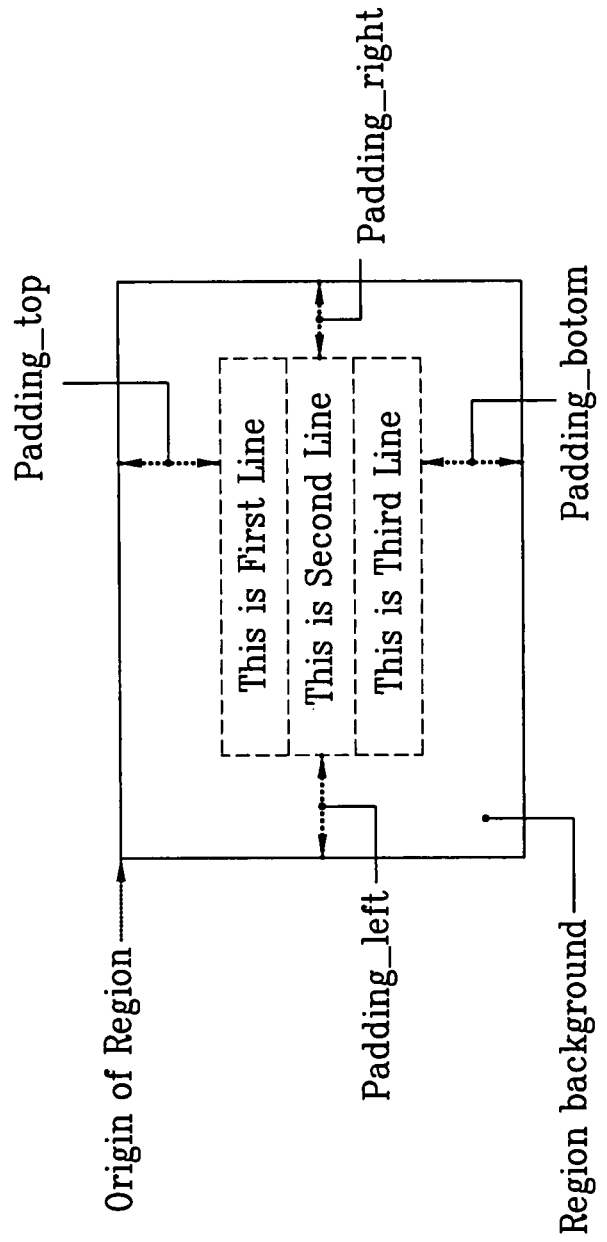

FIGS. 12A to 12C show another example of displaying a text box according a text_box_horizontal_position, a text_box_vertical_position and a text_flow defined according to the first embodiment of the present invention shown in FIG. 10A.

That is, FIG. 12A shows that the text_box_horizontal_position, the text_box_vertical_position and the text_flow are defined to display the text data at left-top when the text_flow is left to right. FIG. 12B shows that the text_box_horizontal_position, the text_box_vertical_position and the text_flow are defined to display the text data at right-top when the text_flow is right to left. FIG. 12C shows that the text_box_horizontal_position, the text_box_vertical_position and the text_flow are defined to display the text data at right-top when the text_flow is top to bottom.

As shown in FIGS. 12A to 12C, the origin of the text data is changed to the left-top to the right-top according to the text_flow without respect to the text alignment.

FIG. 13A shows a function dialog_styleset( ) defined in the function dialog_style_unit( ) in accordance with a second embodiment of the present invention. The second embodiment of the dialog_style_unit( ) records text padding information instead of the text box information.

That is, for defining a size of the text data in the region, the text padding information is recorded as the region style information. The text padding information includes a padding_top, a padding_bottom, a padding_left and a padding_right. By the text padding information, an entire size of the text data in the region may be confirmed.

Information except the text padding information are identical to the first embodiment. Therefore, detailed explanation is omitted.

FIG. 13B shows a position of the text data in a region having text padding information. A position of the text data in the region is confirmed according to the padding_top, the padding_bottom, the padding_left and the padding_right, which are defined in the dialog_styleset( ) of the second embodiment.

FIG. 14A shows a function dialog_styleset( ) defined in the function dialog_style_unit( ) in accordance with a third embodiment of the present invention. The third embodiment of the dialog_styleset( ) records a text_horizontal_position and a text_vertical_position instead of text box information and the text padding information, and the text_horizontal_position and the text_vertical_position are changed according to the text_alignment.

That is, the text_horizontal_position and the text_vertical_position are recorded for representing a reference position of the text data in the region. The reference position is defined to be modified according to the text_alignment such as left, center and right.

Information except the text_horizontal_position and the text_vertical_position are identical to the first embodiment. Therefore, detailed explanations are omitted.

Figure 14B:
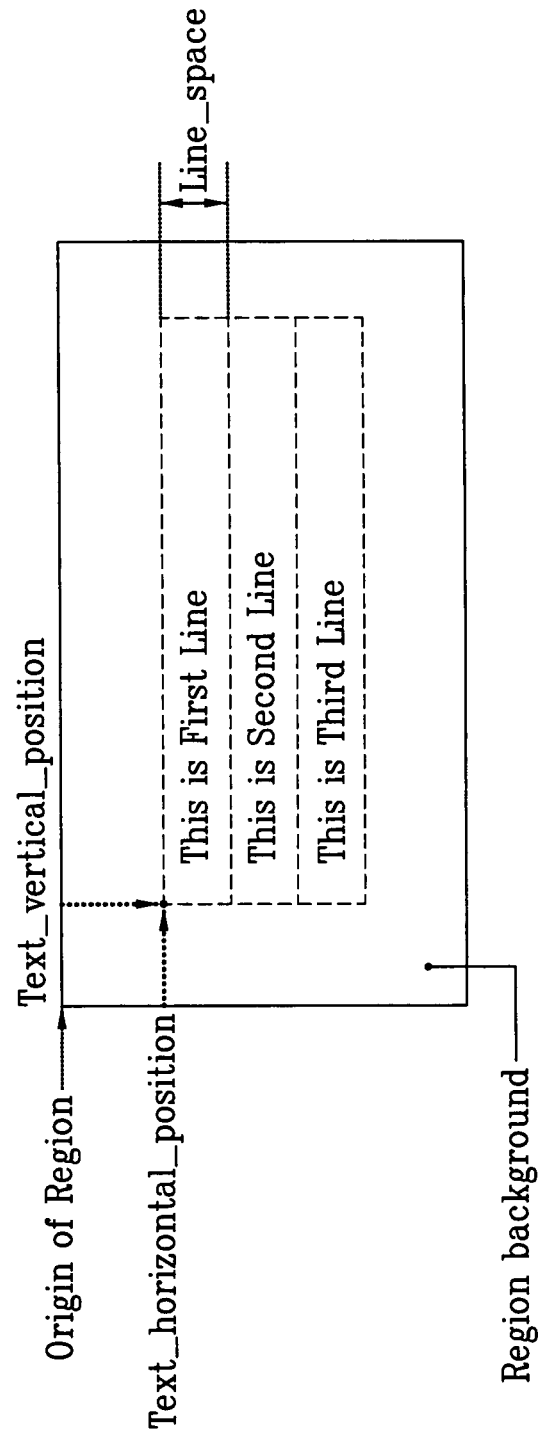
Figure 14C:
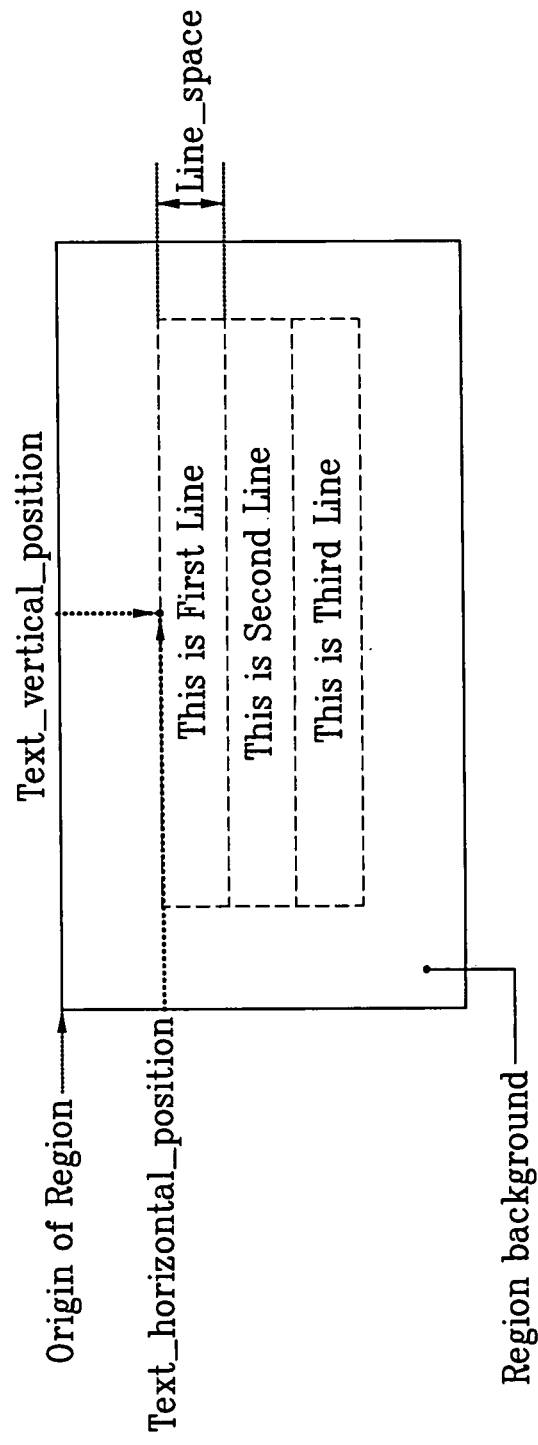
Figure 14D:
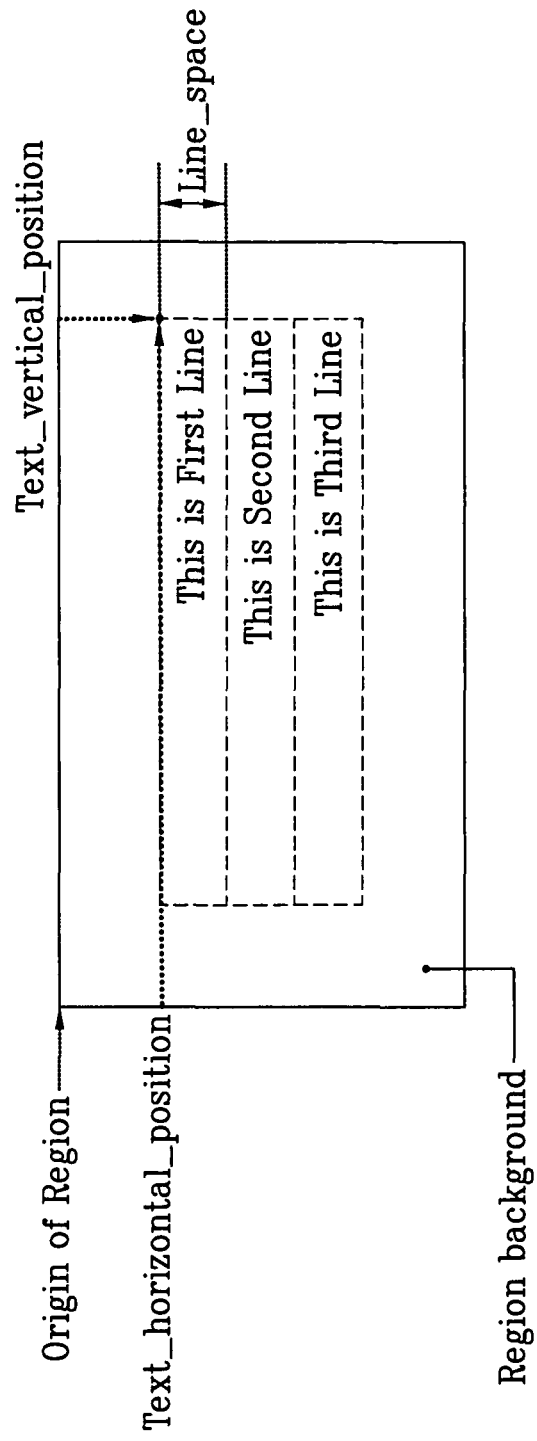

FIGS. 14B to 14D shows positions of the text data if the text flow is left to right or right to left, and the text_alignment is defined as left (FIG. 14B) a center (FIG. 14C) or right (FIG. 14D).

That is, if the text_alignment is defined as the left as shown in FIG. 14B, the text_horizontal_position and the text_vertical_position are defined as assigning a left position where a first line of the text data is started. If the text_alignment is defined as the center as shown in FIG. 14C, the text_horizontal_position and the text_vertical_position are defined to assigning a center position where a first line of the text data is started. If the text_alignment is defined as the right as shown in FIG. 14C, the text_horizontal_position and the text_vertical_position are defined as assigning a right position where a first line of the text data is ended.

Figure 14E:
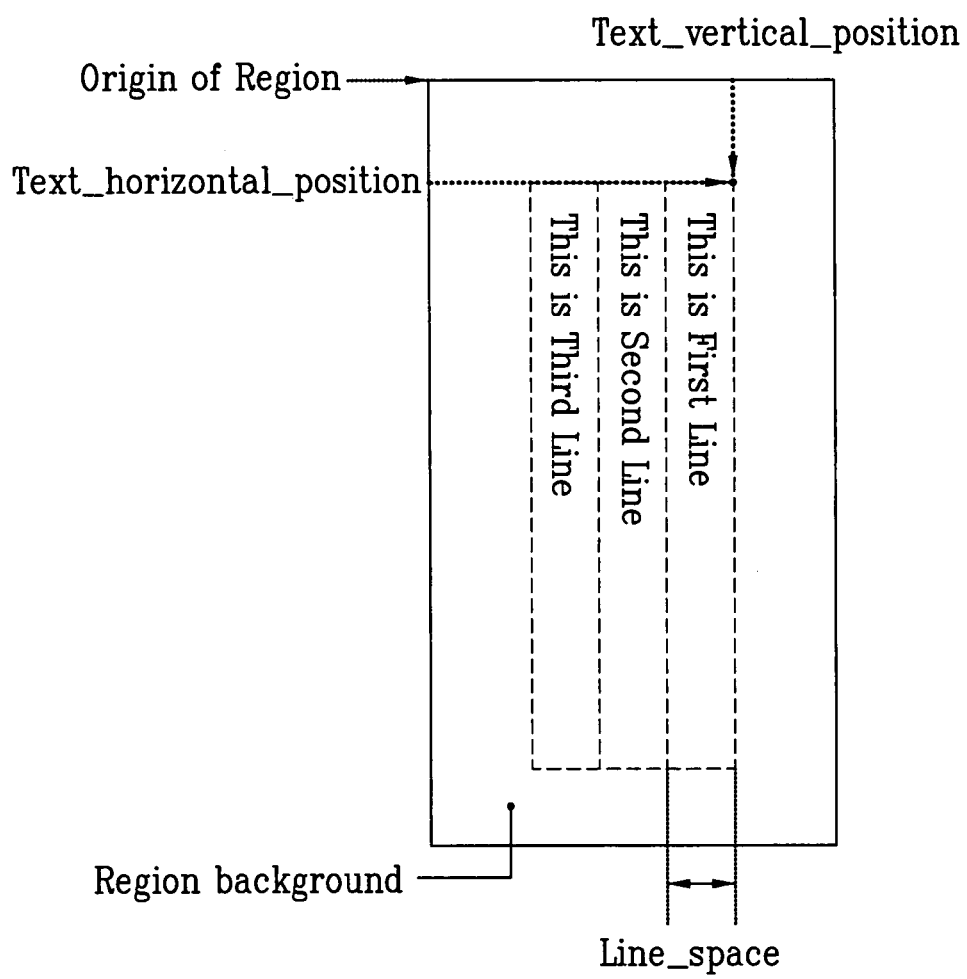
Figure 14F:
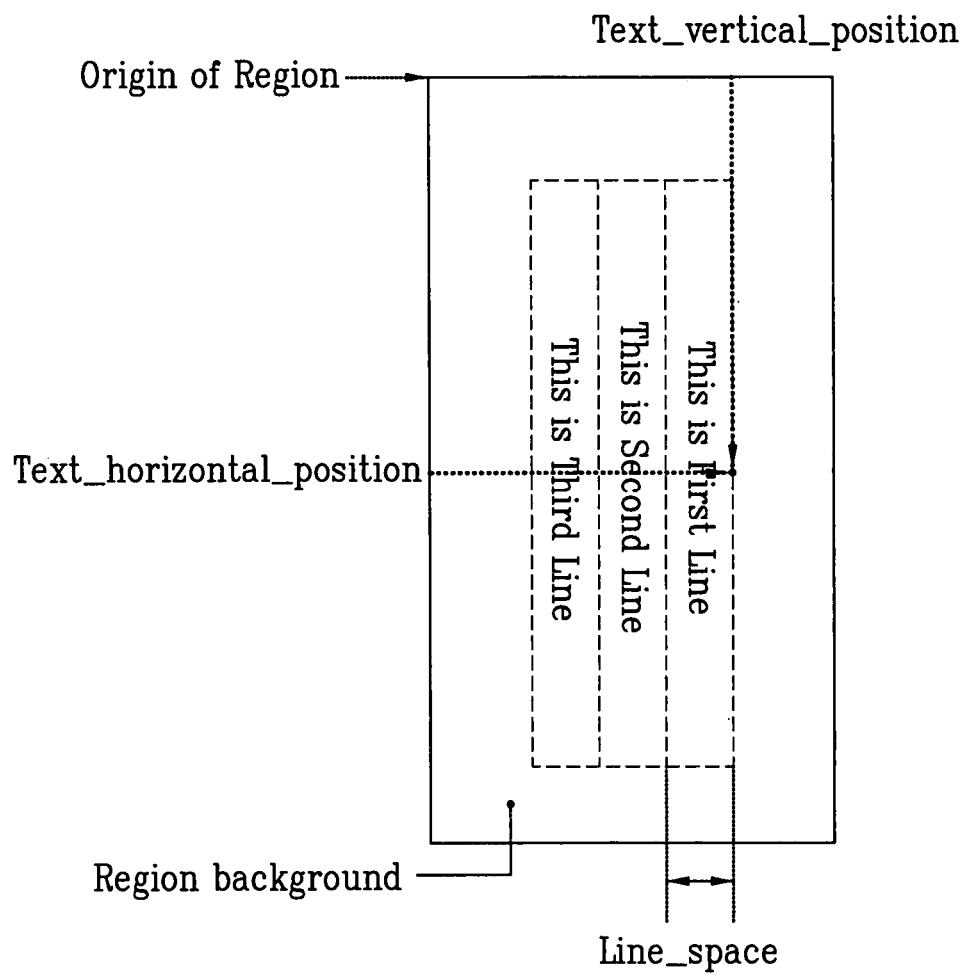
Figure 14G:
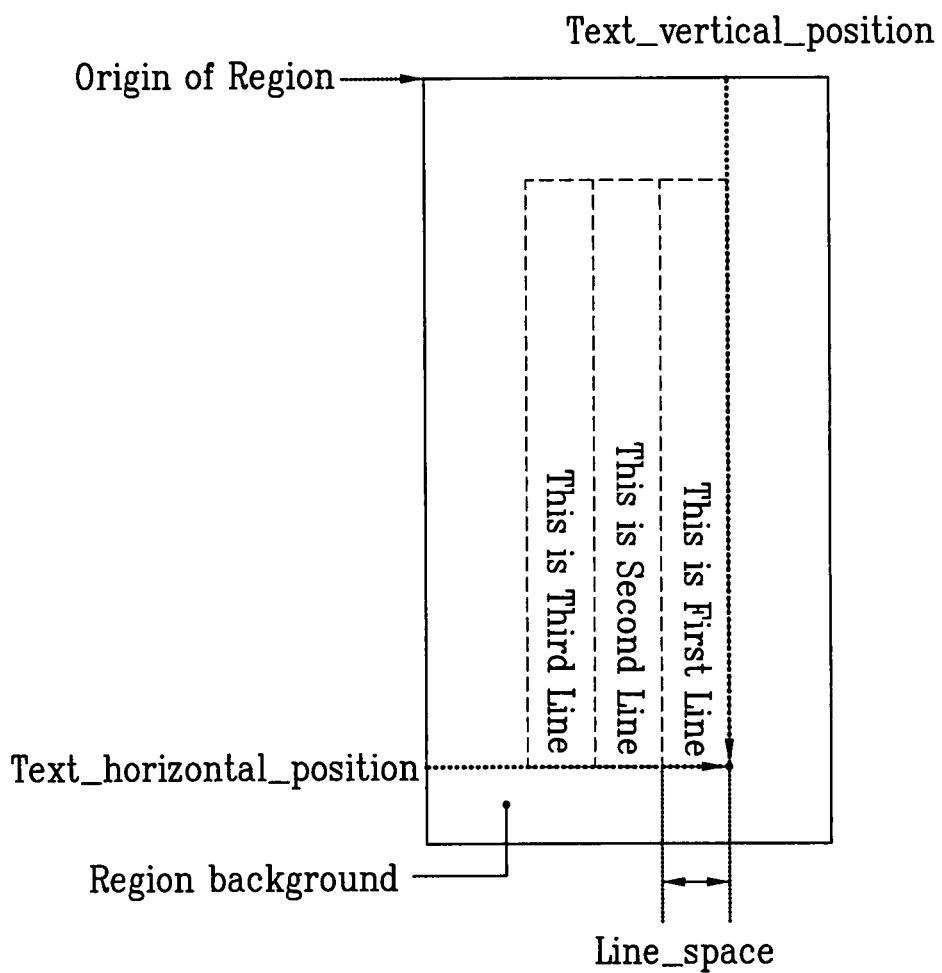

FIGS. 14E to 14G shows positions of the text data if the text flow is top to bottom, and the text_alignment is defined as top(left) (FIG. 14E) a center (FIG. 14F) and a bottom(right) (FIG. 14G).

If the text_alignment is defined as top as shown in FIG. 14E, the text_horizontal_position and the text_vertical_position are defined to assign a top position where a first line of the text data is started. If the text_alignment is defined as the center as shown in FIG. 14F, the text_horizontal_position and the text_vertical_position are defined to assign a center position where a first line of the text data is started. If the text_alignment is defined as the bottom as shown in FIG. 14G, the text_horizontal_position and the text_vertical_position are defined as assign a bottom position where a first line of the text data is ended.

As mentioned above, the text data is displayed with the main AV stream the display by defining the reference position where the text data box or the text data is recorded according to one of the first, the second and the third embodiments.

Hereinafter, a method for reproducing the above mentioned text subtitle stream file and displaying the reproduced text subtitle stream file will be explained by referring to FIGS. 15 to 18.

Figure 15:
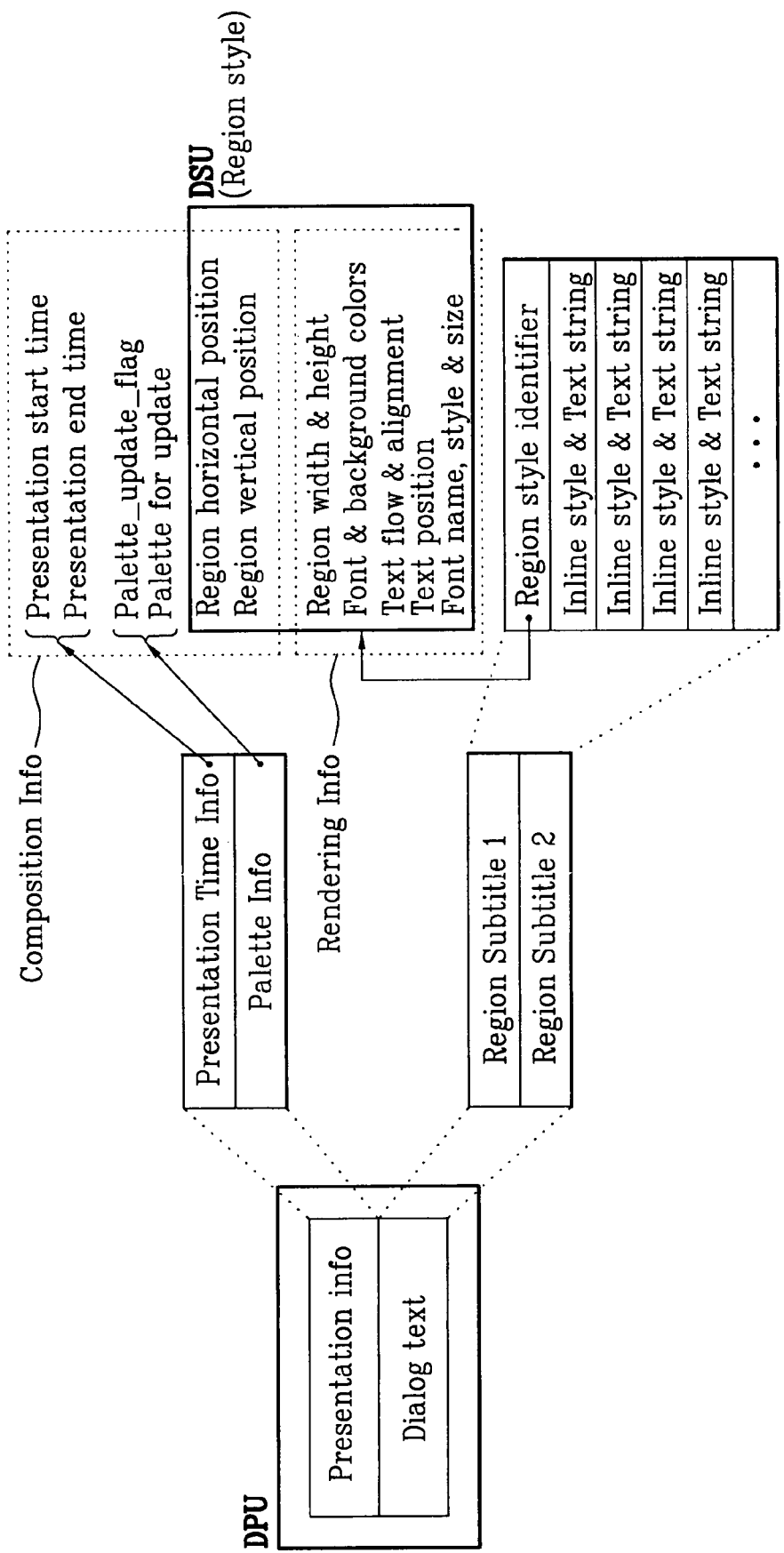
FIG. 15 illustrates a data structure recorded in a text subtitle stream in accordance with an example embodiment of the present invention.

FIG. 15 is a diagram illustrating information included in the dialog presentation unit (DPU) and the dialog style information unit (DSU). As mentioned above, the DSU includes a set of region style information applied to each region in each dialog and the DPU includes dialog text information and presentation information.

The dialog text information includes a region style identifier defining style information applied to each region, a text string and Inline style information applied to the text string. The region style identifier is information for linking a corresponding region to region style information in the dialog style information unit (DSU).

The presentation information in the DPU includes a presentation time stamp (PTS) start time (PTS_start) and a presentation time stamp end time (PTS_end) for displaying each dialog, a palette update information (palette_update_flag) for changing colors used during display of the dialog and modified palette information (Palette for update) when there is color modification.

That is, the text subtitle stream is constructed with the dialog style information in the DSU and the dialog presentation information in the DPU. And, the information included in the DSU and the DPU are classified into three types of information according to functions of the information. In other words, the information is classified into dialog text information including a text string; composition information including times for display, positions of the dialog and modification of color; and rendering information for converting text information to graphic information.

As mentioned above, information in the DSU is used as the composition information and as the rendering information. As shown in FIG. 15, information of "Region horizontal position", "region vertical position" is used as the composition information since the "region horizontal position" and the "region vertical position" represents position of a region in a displayed image. Also, the information "region width & height", "Font & background colors", "Text flow & alignment", and "Font name, style & size" are used as the rendering information since the information are used for expressing texts according to each region of each dialog. Also, the information "text position" such as text box information, text padding information and text horizontal/vertical reference position information are included in the rendering information.

Hereinafter, a method and an apparatus for reproducing a text subtitle including the reproducing management information will be explained.

Figure 16:
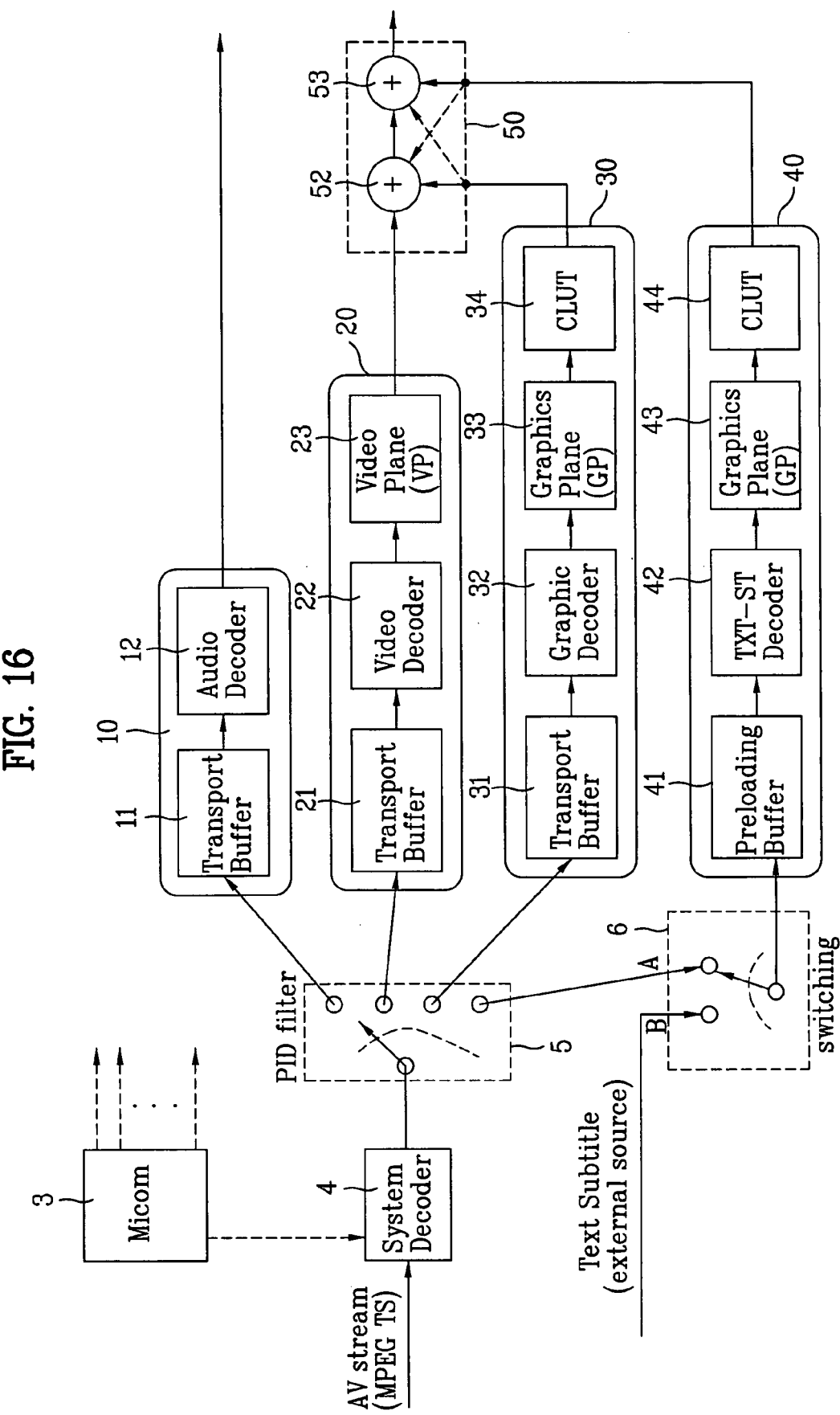
FIG. 16 illustrates a decoding unit of an optical disk reproducing apparatus having a text subtitle stream in accordance with an example embodiment of the present invention.

FIG. 16 is a diagram illustrating an optical disk reproducing apparatus including a decoding unit 40 for reproducing the text subtitle in accordance with an example embodiment of the present invention.

As shown in FIG. 16, the optical disk reproducing apparatus includes a micro-computer 3, a system decoder 4, a PID filter 5, an audio decoding unit 10, a video decoding unit 20, a graphic decoding unit 30, a subtitle decoding unit 40, a selecting unit 6 and a mixing unit 50.

The system decoder 4 decodes signals reproduced from an optical disc into a AV stream (e.g., MPEG stream) under the control of the micro-computer 3. While not shown for the sake of clarity, the micro-computer 3 also controls the other elements of the apparatus based on input received from a user (e.g., via control buttons on the apparatus or a remote control) and management information, such as described above, reproduced from the optical disk. The PID filter 5 receives the AV stream and from the system decoder 4 extracts the separate streams that are present such as a video stream, an audio stream, a graphic stream and a text subtitle stream based on a packet identifier (PID) such as in the transport packets of an MPEG stream. The video decoding unit 20 receives the extracted video stream from the PID filter 5 and decodes the extracted video stream for reproducing the extracted video stream. The audio decoding unit 10 receives the extracted audio stream from the PID filter 5 and decodes the extracted audio stream for reproducing the extracted audio stream. The graphic decoding unit 30 receives the extracted graphic stream from the PID filter 5 and decodes the extracted graphic stream for reproducing the extracted graphic stream. Also, the text subtitle decoding unit 40 receives the extracted text subtitle stream from the PID filter 5 and decodes the extracted text subtitle stream for reproducing the extracted text subtitle stream.

The optical disk reproducing apparatus may also or instead receive the text subtitle from an external source. Therefore, the optical disk reproducing apparatus of this embodiment may further include a selecting unit 6 for selecting an input source for the text subtitle decoding unit 40.

If the text subtitle is recorded with the main data based on a MPEG format, the input source is the PID filter 5. Accordingly, the selecting unit 6 selects the PID filter 5 as the input source of the text subtitle stream and the selecting unit 6 transfers the extracted text subtitle stream from the PID filter 5 to the text subtitle decoding unit 40, which is shown as A in FIG. 16. If the optical disk reproducing apparatus receives the text subtitle from an external source, the selecting unit 6 selects the external source as the input source of the text subtitle stream and the selecting unit 6 transfers the text subtitle stream from the external source to the text subtitle decoding unit 40, which is shown as B in FIG. 16.

The video decoding unit 20, the audio decoding unit 10 and the graphic decoding unit 30 each include a transport buffers 11, 21, 31, respectively, for buffering the video, the audio and the graphic streams. The video decoding unit 20 also includes a video decoder 22 and a video plane 23 for reading the extracted video stream stored in the transport buffer 21, decoding the extracted video stream and generating a video plane based on the decoded video data, which is single video image frame for display on a display. The graphic decoding unit 30 also includes a graphic decoder 32 and a graphic plane 33 for decoding the extracted graphic stream stored in the transport buffer 31 and generating a graphic plane based on the decoded graphic data, which is single graphic image frame for display with the generated video plane. The graphic decoding unit 30 further includes a color look up table (CLUT) 34. The CLUT 34 includes vales for controlling a color and a transparency of the generated graphic plane for overlapping the graphic plane with the video plane.

The text subtitle decoding unit 40 includes a preloading buffer 41, a TXT-ST decoder 42, a graphic plane (GP) 43 and a CLUT 44. The text subtitle decoding unit 40 receives the text subtitle data from the selecting unit 6 and the received text subtitle data is preloaded in the preloading buffer 41. Generally, a size of single test subtitle data including reproducing management information is about 0.5 Mbyte. Therefore, a capacity of the preloading buffer 41 should be more than 0.5 Mbyte. For providing seamless reproducing, the capacity of the preloading buffer 41 should be much more than 0.5 Mbyte. For example, the size of the preloading buffer 41 may be standardized by considering the size of the text subtitle data.

The text subtitle data is preloaded in the preloading buffer 41 because of following a reason. The text subtitle data may be recorded in a separate file since a size of entire text subtitle is comparatively small. By providing a separate file of the text subtitle, it can be easily read and effectively used for reproducing the text subtitle. Also, controlling the buffer is more convenient by preloading the entire subtitle data in the preloading buffer 41.

The text subtitle (TXT-ST) decoder 42 reads the text subtitle data stored in the preloading buffer 41 and decodes the text subtitle data. The graphics plane 43 generates a subtitle graphic plane, which is a single subtitle image frame for display with the graphic plane and the video plane, by using the decoded text subtitle data. A color and a transparency of the subtitle graphic plane are controlled according to values in the CLUT 44 for overlapping the subtitle graphic plane with the graphic plane and the video plane.

The mixing unit 50 of the optical disk reproducing apparatus includes two adders 52 and 53 for mixing signals output from the video decoding unit 20, the graphic decoding unit 30 and the text subtitle decoding unit 40 and for generating video image frames with corresponding graphic planes and subtitles. That is, the mixing unit 50 receives the video plane generated by the video decoding unit 20, the graphic plane generated by the graphic decoding unit 30 and the subtitle plane generated by the text subtitle decoding unit 40 and generates the single video image frame with corresponding subtitle by overlapping the video plane, the graphic plane and the subtitle graphic plane. Basically, the video plane becomes a background of the single video image frame. The graphic plane and the subtitle graphic plane are overlapped on the video plane. The order of overlapping is determined according to characteristics of the graphic plane and the subtitle graphic plane. For example, if the graphic plane is a presentation graphic, the graphic plane is overlapped on the video plane by the adder 52 in the mixing unit 50 first. The subtitle graphic plane generated by the text subtitle decoding unit 40 is overlapped on the output of the adder 52 by the adder 53 of the mixing unit 50. By contrast, if the graphic plane from the graphic decoding unit 30 is an interactive graphic, the subtitle graphic plane is overlapped on the video plane by the adder 52 in the mixing unit 50 at first, and then the graphic plane is on the output of the adder 52 by the adder 53 of the mixing unit 50.

Hereinafter, a method for reproducing a text subtitle by using the text subtitle decoding unit 40 based on the text subtitle decoder 42 will be explained in detail.

Figure 17:
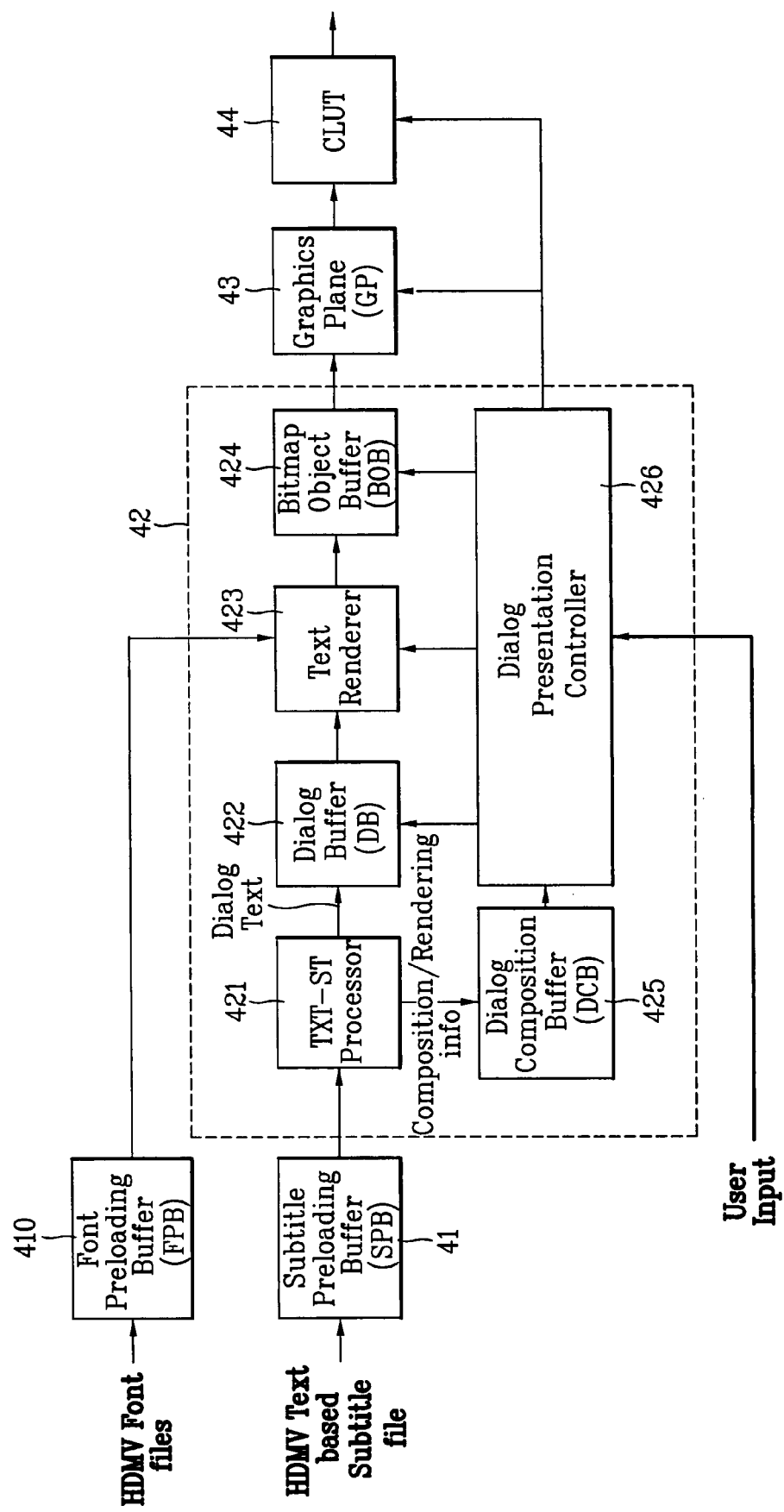
FIG. 17 illustrates a text subtitle stream decoder in accordance with an example embodiment of the present invention.

FIG. 17 is a diagram illustrating the text subtitle decoding unit 40 in accordance with an example embodiment of the present invention. Like reference numbers of the FIGS. 16 and 17 represent identical functional blocks.

Hereinafter, reproducing a title according to an embodiment of the present invention will be explained in detail by referring FIGS. 1 to 16 and FIG. 17.

When an optical disk is loaded, the optical disk reproducing apparatus reads and stores file information for reproducing and managing reproduction of information. When a user requests to reproduce a title recorded in the optical disk, the optical disk reproducing apparatus reproduces the playlist related to the title. For example, if the playlist shown in FIG. 4 is reproduced, the optical disk reproducing apparatus reproduces the main AV data managed by the playitem by using the video and the audio decoding units 10 and 20. Also, a text subtitle stream managed by the subplayitem is stored in the preloading buffer 41 and a font file is extracted from the optical disk according to the font information assigned by the text subtitle stream. The extracted font file is stored in a font preloading buffer 410. For example, if the user selects Korean subtitle among the text subtitle streams managed by the subplayitem, "Text subtitle Clip 2" is stored in the preloading buffer 41. Simultaneously, the font file aaaaa.font is extracted according to the font information assigned in the clip information of the "Text Subtitle Clip 2" and the font file aaaaa.font is stored in the font preloading buffer 410. After extracting and storing the corresponding text subtitle stream, the text subtitle decoding unit 40 decodes the text subtitle stream for generating the subtitle graphic plane and transfers the generated subtitle graphic plane to the mixing unit 50 for displaying the subtitle with the video image frame generated by processing the main video data managed by the playitem.

The decoding of the text subtitle stream is classified into three steps. In the first step, the text subtitle stream is separated according to a purpose. That is, the composition information, rendering information and the dialog text information are separated from the text subtitle stream. This act of separating data is commonly called parsing.

In the second step, the text data included in the dialog text information is rendered as bitmap data by using the rendering information. This is called rendering.

In the third step, the rendered text data is added in the graphic plane based on the composition information. That is, the bitmap data is added to the graphic plane for reproducing the text subtitle. This is called composition.

To perform the parsing step, the text subtitle decoder 42 includes a text subtitle (TXT_ST) processor 421 that stores the separated composition information and the rendering information in a dialog composition buffer (DCB) 425, and stores separated dialog text information in a dialog buffer (DB) 422.

To perform the rendering step, the text subtitle decoder 42 includes a text renderer 423 and a dialog presentation controller (DP) 426. As discussed above, in this step, the text data among the separated dialog text information is rendered to bitmap data. The text renderer 423 receives the font information applied to the text data from the font preload buffer 410 and the rendering information applied to the text data from the DP controller 426. Then, the text renderer 423 renders the text data to bitmap data by using the inline style information applied to each text string of the text data. After rendering, the bitmap data is stored in a bitmap object buffer (BOB) 424.

The "object" stored in the BOB 426 is text data of each region in the dialog that has been converted to bitmap.

Also, the rendering step may be performed by at least two methods. As a first method, the text data may be rendered after confirming the origin where the text data is to be displayed according one of the first, the second and the third embodiments for determining a position of the text data in the region, that are shown in FIG. 10A to 14G. As a second method, the text data is rendered at first and then the rendered text data is arranged with respect to the origin of the region according to one of the first, the second and the third embodiments shown in FIGS. 10A to 14G.

For the composition step, the text subtitle decoder 42 includes the DP controller 426 arranges the bitmap object stored in the BOB 424 in the graphic plane 43 according to the composition information. The palette information among the composition information is inputted to the CLUT 44 and used for controlling modification of the color and transparency. Then, the generated subtitle graphic plane is transferred to the mixing unit 50 in FIG. 16 for mixing the subtitle graphic plane with the video plane to generate the video image frames with the subtitle.

As mentioned above, a user may change the style information in the rendering step and the composition step. In this case, the DP controller 426 receives user input and performs the rendering and the composition based on the user input. But, it may be preferable to limit style information to be changed by the user since if the user changes all style information, the text subtitle may be reproduced incorrectly. That is, the style information to be changed by the user may be limited to the region position and the font size.

Figure 18:
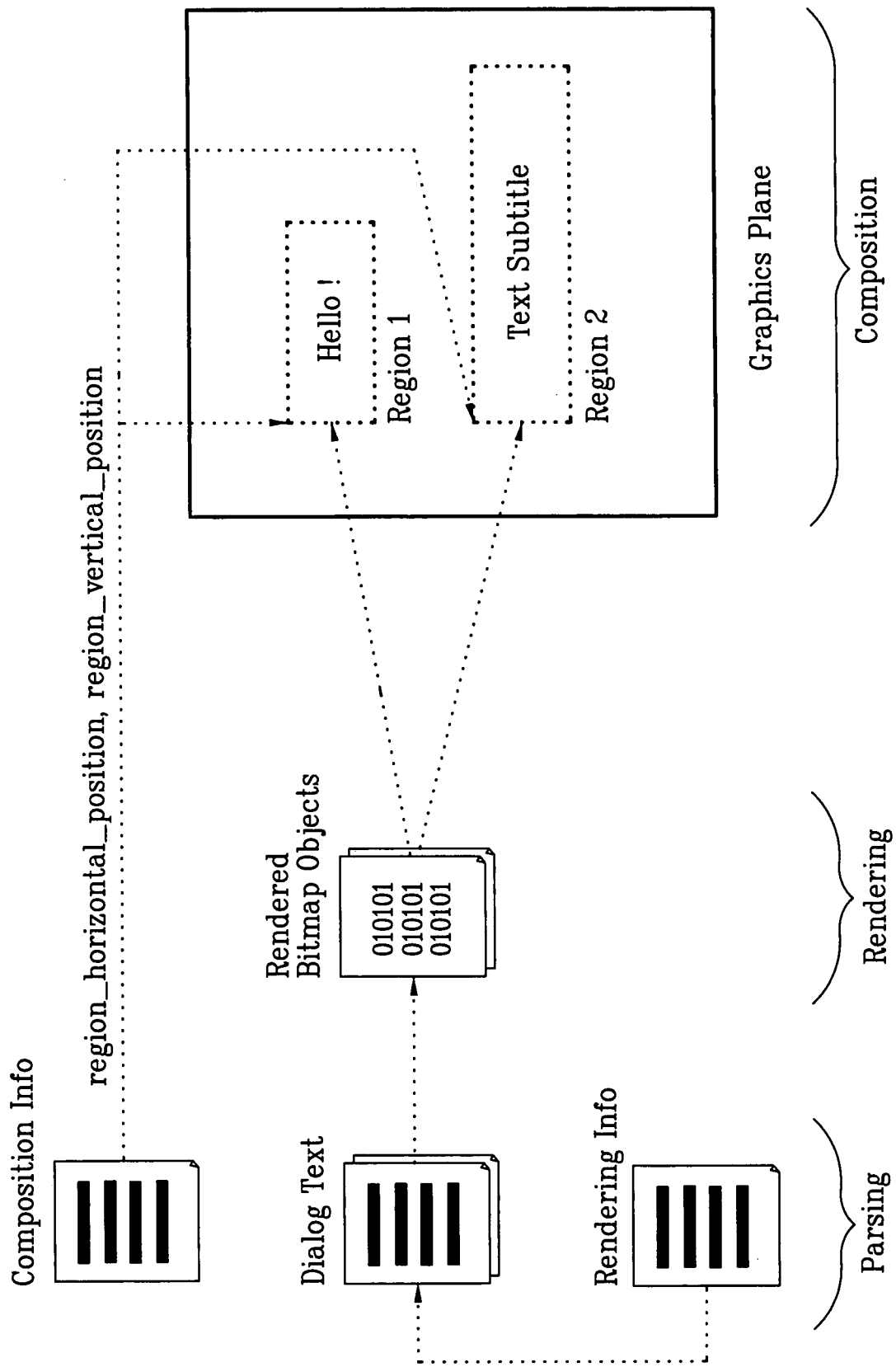
FIG. 18 illustrates a method for reproducing a text subtitle stream in accordance with an example embodiment of the present invention.

FIG. 18 is a view showing the decoding the text subtitle by the parsing step, the rendering step and the composition step in accordance with an example embodiment of the present invention.

That is, the rendering step is performed by using the rendering information and the dialog text information separated in the parsing step and the composition step is performed for arranging the bitmap object generated by the rendering step using the composition information separated in the parsing steps.

As mentioned above, the text subtitle stream file is recorded in the optical disk as standardized information according to the method for constructing the text subtitle stream file in the high density optical disk of the present invention. Also, the text subtitle recorded in the optical disk is effectively reproduced according to the method and the apparatus for reproducing the text subtitle of the present invention.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A method of reproducing text subtitle streams, the method comprising:

reading at least one text subtitle stream including a style segment and a plurality of presentation segments to which the style segment is applied, the style segment being included in a first packet of the text subtitle stream, the presentation segments being respectively included in a plurality of packets which follow the first packet, the style segment including at least one set of style information, the at least one set of style information including region positioning information for positioning a region in an image, text box positioning information for positioning a text box in the region, and text flow information indicating character progression and line progression of text subtitle data, and each presentation segment including field information and at least one region subtitle, the field information including presentation start time and presentation end time of the corresponding presentation segment, each region subtitle including the text subtitle data and a region style identifier, the region style identifier identifying one of the at least one set of style information in the style segment to apply to the text subtitle data, identical text flow information being applied to each region subtitle in the corresponding presentation segment when the presentation segment includes a plurality of region subtitles; and decoding the at least one presentation segment based on the region style identifier of the at least one presentation segment.

2. The method of claim 1, wherein the region positioning information includes a horizontal position and a vertical position of the upper left corner of the region in the image.

3. The method of claim 2, wherein
the at least one set of style information further includes region size information indicating a height of the region and a width of the region; and
the at least one set of style information further includes an indicator of a background color for the region.

4. The method of claim 1, wherein the text box positioning information includes a position of an upper left corner of the text box in the region.

5. The method of claim 4, wherein the text box positioning information includes a horizontal position and a vertical position of the upper left corner of the text box in the region; and
the at least one set of style information further includes text box size information indicating a height of the text box and a width of the text box, text alignment information indicating how to align text subtitle data in the text box, line space information indicating a spacing to employ between lines of text subtitle data in the text box, a font identifier identifying a font file recorded on the recording medium to use in reproducing text subtitle data in the text box, a font style indicator indicating a font style to apply to text subtitle data in the text box, font size information indicating a font size to apply to text subtitle data in the text box, and font color information indicating a color to apply to text subtitle data in the text box.

6. The method of claim 1, wherein the at least one set of style information includes user changeable information, the user changeable information indicating a horizontal direction that a user may move the region, a vertical direction the user may move the region, whether the user may one of increase and decrease the font size, a horizontal direction the user may move the text box, a vertical direction the user may move the text box, whether the user may one of increase and decrease the height of the text box, whether the user may one of increase and decrease the width of the text box, and whether the user may one of increase and decrease the spacing to employ between lines of text subtitle data in the text box.

7. The method of claim 1, wherein the at least one text subtitle stream is downloaded from an external source.

8. The method of claim 1, the method further comprising:
reading a playlist including at least one playitem and at least one subplayitem, the playitem including management information for managing reproduction of a main at least one of Audio and Video stream, the subplayitem including management information for managing reproduction of the text subtitle stream, one of the at least one subplayitem indicating multi clips including the text subtitle stream for different languages.

9. The method of claim 1, wherein the decoding process includes,
rendering the text subtitle data into bitmap object in the region according to rending information including at least the text box positioning information; and
composing the rendered bitmap object in the region of an image according to composing information including at least the region positioning information.

10. A method of recording text subtitle streams, the method comprising:
recording at least one text subtitle stream including a style segment and a plurality of presentation segments to which the style segment is applied, the style segment being included in a first packet of the text subtitle stream, the presentation segments being respectively included in a plurality of packets which follow the first packet, the style segment including at least one set of style information, the at least one set of style information including region positioning information for positioning a region in an image, text box positioning information for positioning a text box in the region, and text flow information indicating character progression and line progression of text subtitle data, and each presentation segment including field information and at least one region subtitle, the field information including presentation start time and presentation end time of the corresponding presentation segment, each region subtitle including the text subtitle data and a region style identifier, the region style identifier identifying one of the at least one set of style information in the style segment to apply to the text subtitle data, identical text flow information being applied to each region subtitle in the corresponding presentation segment when the presentation segment includes a plurality of region subtitles.

11. The method of claim 10, wherein the region positioning information includes a horizontal position and a vertical position of the upper left corner of the region in the image.

12. The method of claim 10, wherein the text box positioning information includes a position of an upper left corner of the text box in the region.

13. The method of claim 10, wherein the at least one text subtitle stream is downloaded from an external source.

14. The method of claim 10, the method further comprising:
recording a playlist including at least one playitem and at least one subplayitem, the playitem including management information for managing reproduction of a main at least one of Audio and Video stream, the subplayitem including management information for managing reproduction of the text subtitle stream, one of the at least one subplayitem indicating multi clips including the text subtitle stream for different languages.

15. The method of claim 10, wherein the text subtitle data is rendered into bitmap object in the region according to rending information including at least the text box positioning information; and the rendered bitmap object is composed in the region of an image according to composing information including at least the region positioning information.

16. A system for decoding text subtitle stream, the system comprising:

a preloading buffer configured to preload at least one text subtitle stream;

a text subtitle decoder configured to decode the text subtitle stream including a style segment and a plurality of presentation segments to which the style segment is applied, the style segment being included in a first packet of the text subtitle stream, the presentation segments being respectively included in a plurality of packets which follow the first packet, the style segment including at least one set of style information, the at least one set of style information including region positioning information for positioning a region in an image, text box positioning information for positioning a text box in the region, and text flow information indicating character progression and line progression of text subtitle data, and each presentation segment including field information and at least one region subtitle, the field information including presentation start time and presentation end time of the corresponding presentation segment, each region subtitle including the text subtitle data and a region style identifier, the region style identifier identifying one of the at least one set of style information in the style segment to apply to the text subtitle data, identical text flow information being applied to each region subtitle in the corresponding presentation segment when the presentation segment includes a plurality of region subtitles.

17. The system of claim 16, wherein the region positioning information includes a horizontal position and a vertical position of the upper left corner of the region in the image.

18. The system of claim 16, wherein the text box positioning information includes a position of an upper left corner of the text box in the region.

19. The system of claim 16, wherein the at least one text subtitle stream is downloaded from an external source.

20. The system of claim 16, wherein the controller is further configured to read a playlist including at least one playitem and at least one subplayitem, the playitem including management information for managing reproduction of a main at least one of Audio and Video stream, the subplayitem including management information for managing reproduction of the text subtitle stream, one of the at least one subplayitem indicating multi clips including the text subtitle stream for different languages.

21. The system of claim 16, wherein the decoder is configured to render the text subtitle data into bitmap object in the region according to rendering information including at least the text box positioning information, and compose the rendered bitmap object in the region of an image according to composing information including at least the region positioning information.

22. An apparatus for recording a text subtitle stream, the apparatus comprising:

a controller configured to record at least one text subtitle stream in a non-transitory computer recording medium, the at least one text subtitle stream including a style segment and a plurality of presentation segments to which the style segment is applied, the style segment being included in a first packet of the text subtitle stream, the presentation segments being respectively included in a plurality of packets which follow the first packet, the style segment including at least one set of style information, the at least one set of style information including region positioning information for positioning a region in an image, text box positioning information for positioning a text box in the region, and text flow information indicating character progression and line progression of text subtitle data, and each presentation segment including field information and at least one region subtitle, the field information presentation start time and presentation end time of the corresponding presentation segment, each region subtitle information including text subtitle data and a region style identifier, the region style identifier identifying one of the at least one set of style information in the style segment to apply to the text subtitle data, identical text flow information being applied to each region subtitle in the corresponding presentation segment when the presentation segment includes a plurality of region subtitles.

23. The apparatus of claim 22, wherein the region positioning information includes a horizontal position and a vertical position of the upper left corner of the region in the image.

24. The apparatus of claim 22, wherein the text box positioning information includes a position of an upper left corner of the text box in the region.

25. The apparatus of claim 22, wherein the at least one text subtitle stream is downloaded from an external source.

26. The apparatus of claim 22, wherein the controller is further configured to record a playlist including at least one playitem and at least one subplayitem, the playitem including management information for managing reproduction of a main at least one of Audio and Video stream, the subplayitem including management information for managing reproduction of the text subtitle stream, one of the at least one subplayitem indicating multi clips including the text subtitle stream for different languages.

27. The apparatus of claim 22, wherein the text subtitle data is rendered into bitmap object in the region according to rending information including at least the text box positioning information; and the rendered bitmap object is composed in the region of an image according to composition information including at least the region positioning information.

* * * * *